(12) United States Patent
Yamamoto et al.

(10) Patent No.: US 11,444,901 B2
(45) Date of Patent: Sep. 13, 2022

(54) DEVICE, METHOD, AND COMPUTER READABLE MEDIUM FOR IDENTIFYING FRAUDULENT EMAIL USING FUNCTION TERMS

(71) Applicant: Mitsubishi Electric Corporation, Tokyo (JP)

(72) Inventors: Takumi Yamamoto, Tokyo (JP); Hiroki Nishikawa, Tokyo (JP); Kiyoto Kawauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 17/060,773

(22) Filed: Oct. 1, 2020

(65) Prior Publication Data

US 2021/0021555 A1 Jan. 21, 2021

Related U.S. Application Data

(63) Continuation of application No. PCT/JP2018/019656, filed on May 22, 2018.

(51) Int. Cl.
*H04L 9/40* (2022.01)
*H04L 51/212* (2022.01)
(Continued)

(52) U.S. Cl.
CPC .......... *H04L 51/212* (2022.05); *G06K 9/6215* (2013.01); *G06K 9/6234* (2013.01); *G06N 20/00* (2019.01); *H04L 63/1441* (2013.01)

(58) Field of Classification Search
CPC ........ G06F 13/00; G06F 21/57; G06F 21/606; G06K 9/6215; G06K 9/6218;
(Continued)

(56) References Cited

U.S. PATENT DOCUMENTS 10,797,860 B1 * 10/2020 Dennis .................... H04L 9/088
2005/0234850 A1 10/2005 Buchheit et al.
(Continued)

FOREIGN PATENT DOCUMENTS

JP 2004-341911 A 12/2004
JP 2007-531165 A 11/2007
(Continued)

OTHER PUBLICATIONS

CipherCraft/Mail, NTT TechnoCross Corporation, 2018, https://www.ciphercraft.jp/apt/about/, 5 pages.
(Continued)

*Primary Examiner* — Le H Luu
(74) *Attorney, Agent, or Firm* — Birch, Stewart, Kolasch & Birch, LLP

(57) ABSTRACT

A fraudulent email decision device (10) is provided with a consistency analysis unit (24). The consistency analysis unit (24) identifies an intention of a subject email by, for example, a method of, with respect to a newly received incoming email as a subject email, extracting a function term, being a word expressing a reason the subject email was sent, from a body of the subject email. The consistency analysis unit (24) decides whether or not the subject email is a fraudulent email, from a relationship between another incoming email received in the past from the same sender as the sender of the subject email, and the identified intention of the subject email.

10 Claims, 20 Drawing Sheets

(51) Int. Cl.
*G06N 20/00* (2019.01)
*G06K 9/62* (2022.01)

(58) Field of Classification Search
CPC ...... G06K 9/6234; G06N 20/00; H04L 51/12; H04L 51/14; H04L 63/1441; H04L 63/1483; H04L 29/1215; H04L 63/0428; H04L 63/1416; H04L 63/205; G06Q 10/107
See application file for complete search history.

(56) References Cited

U.S. PATENT DOCUMENTS

| | | | |
|---|---|---|---|
| 2006/0242243 A1 | 10/2006 | Matsumoto | |
| 2006/0242708 A1* | 10/2006 | Oswall | H04L 51/12 726/24 |
| 2006/0265747 A1* | 11/2006 | Judge | H04L 51/12 726/22 |
| 2008/0256187 A1* | 10/2008 | Kay | H04L 51/12 709/206 |
| 2008/0282079 A1* | 11/2008 | Yaghmour | H04L 63/0428 713/150 |
| 2009/0307313 A1* | 12/2009 | Wang | G06Q 10/107 709/206 |
| 2010/0287246 A1* | 11/2010 | Klos | H04L 51/28 709/206 |
| 2013/0013634 A1 | 1/2013 | Buchheit et al. | |
| 2013/0013716 A1 | 1/2013 | Buchheit et al. | |
| 2013/0013717 A1 | 1/2013 | Buchheit et al. | |
| 2013/0013718 A1 | 1/2013 | Buchheit et al. | |
| 2014/0089433 A1 | 3/2014 | Buchheit et al. | |
| 2015/0081816 A1* | 3/2015 | Trevelyan | H04L 51/14 709/206 |
| 2016/0103996 A1 | 4/2016 | Salajegheh et al. | |
| 2017/0346851 A1* | 11/2017 | Drake | H04L 9/0838 |
| 2018/0054414 A1* | 2/2018 | LeVasseur | H04L 51/16 |
| 2018/0159810 A1 | 6/2018 | Buchheit et al. | |
| 2018/0183778 A1* | 6/2018 | Bettenburg | G06F 21/57 |
| 2020/0067861 A1* | 2/2020 | Leddy | G06Q 30/0185 |

FOREIGN PATENT DOCUMENTS

| | | |
|---|---|---|
| JP | 2010-134848 A | 6/2010 |
| JP | 2017-538185 A | 12/2017 |
| JP | 2018-18542 A | 2/2018 |

OTHER PUBLICATIONS

Duman et al., "EmailProfiler: Spearphishing Filtering with Header and Stylometric Features of Emails," Computer Software and Applications Conference (COMPSAC), IEEE 40th Annual, 2016, pp. 1-9.

International Search Report (PCT/ISA/210) issued in PCT/JP2018/019656, dated Jul. 10, 2018.

Nishikawa et al., "Detection method what suspicious email is based on email context," Computer Security Symposium, Oct. 23-25, 2017, pp. 15-20.

* cited by examiner

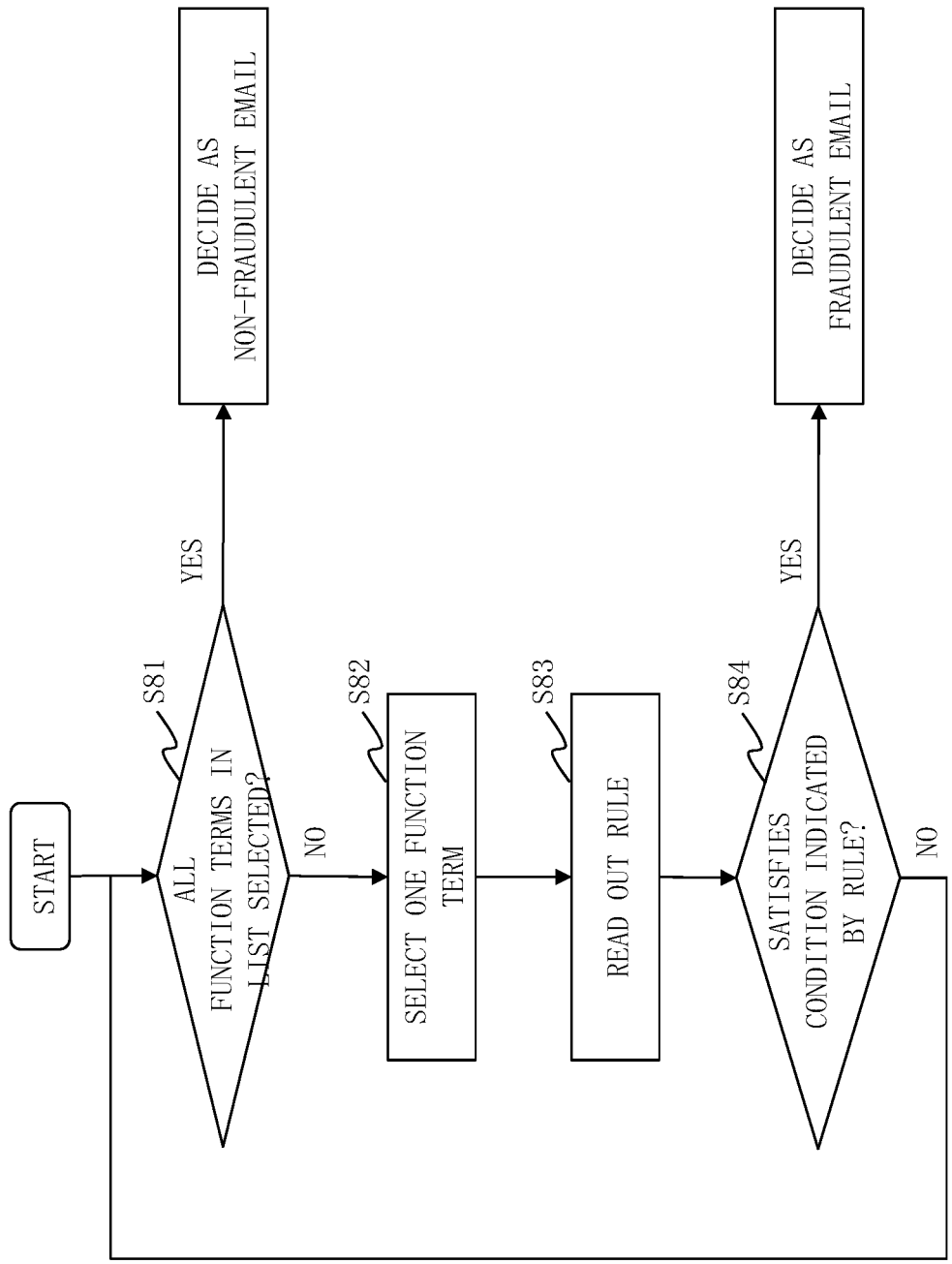

Fig. 15

| RULE | CONTENT |
|---|---|
| RULE 1 | BODY OF SUBJECT EMAIL INCLUDES FUNCTION TERM |
| RULE 2 | CONTENT OF ATTACHMENT OR URL OF SUBJECT EMAIL REFERS TO TOPIC ON WHICH NO TRANSACTION HAS BEEN MADE |
| RULE 3 | SAME EMAIL HAS NOT BEEN SENT FROM SAME SENDER IMMEDIATELY PREVIOUSLY |
| RULE 4 | DIFFERENT ATTACHMENT IS ATTACHED TO SAME EMAIL SENT FROM SAME SENDER IMMEDIATELY PREVIOUSLY |
| RULE 5 | ATTACHMENT IS ATTACHED TO EMAIL SENT FROM SAME SENDER IMMEDIATELY PREVIOUSLY |
| RULE 6 | SAME ATTACHMENT IS ATTACHED TO SAME EMAIL SENT FROM SAME SENDER IMMEDIATELY PREVIOUSLY |
| RULE 7 | SENDER IS QUESTIONED IMMEDIATELY PREVIOUSLY |

Fig. 16

| EMAIL TYPE / FUNCTION TERM | CONTACT-CARD-EXISTING EMAIL | RELATED-FIELD EMAIL | ... |
|---|---|---|---|
| FORWARD | RULE 2 | RULE 2 | |
| RE-FORWARD, RESEND | RULE 1 | RULE 3 or RULE 4 | |
| FORGOT TO ATTACH | RULE 1 | RULE 3 or RULE 5 | |
| MISTAKE | RULE 1 | RULE 3 or RULE 6 | |
| UPDATE | RULE 1 | RULE 3 or RULE 6 | |
| ANSWER, RESPOND | RULE 1 | RULE 3 or RULE 7 | |
| ... | | | |

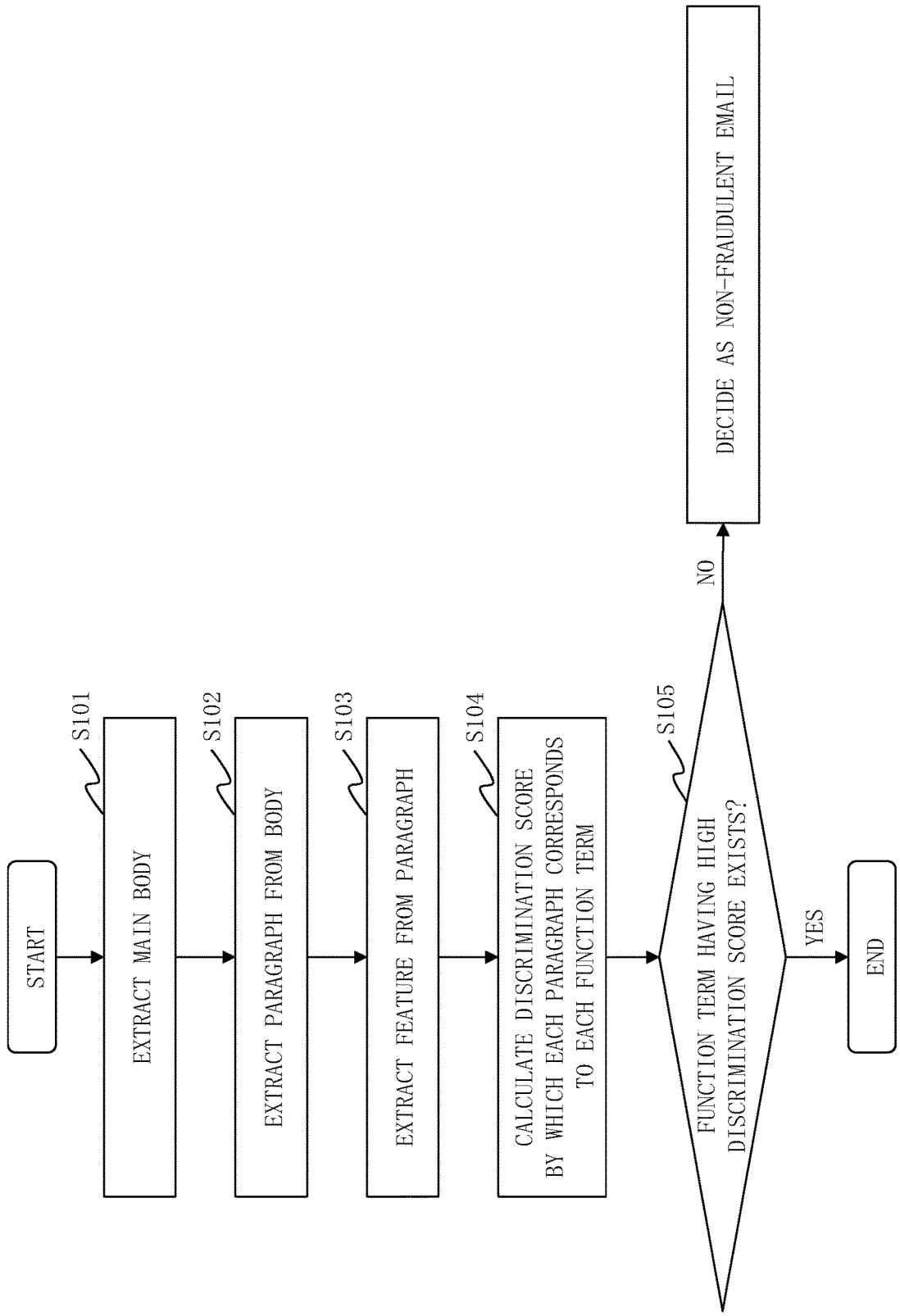

DEVICE, METHOD, AND COMPUTER READABLE MEDIUM FOR IDENTIFYING FRAUDULENT EMAIL USING FUNCTION TERMS

CROSS REFERENCE TO RELATED APPLICATIONS

This application is a Continuation of PCT International Application No. PCT/JP2018/019656, filed on May 22, 2018, which is hereby expressly incorporated by reference into the present application.

TECHNICAL FIELD

The present invention relates to a technique of detecting a targeted-attack email.

BACKGROUND ART

Most of targeted attacks such as Advanced Persistent Threat are targeted-attack emails which are fraudulent emails utilized as an invasion trick of an attack.

A targeted-attack email employs sentences skillfully crafted with using information concerning a target of attack such as an organization and a person. The targeted-attack email entices to open a malicious file attached to the email or to visit a malicious website indicated by a Uniform Resource Locator (URL) written in a body of the email.

Regarding an attachment and a URL, existing techniques are known which statically or dynamically analyze a degree of malignancy of the content. For example, there is a technique that confirms whether an inspection-subject attachment matches with a pattern of known malware, thereby detecting malware. There is also a technique that utilizes a feature of behavior a file shows during execution, thereby detecting malware. There is also a technique that prepares a blacklist of URLs indicating malicious websites, thereby preventing a user from visiting a dangerous web site. There is also malware detection software that incorporates these techniques.

However, the more sophisticated the attacker is, the more likely the attacker confirms in advance whether an attachment and a URL will be detected by malware detection software, before executing the attack. Therefore, it is difficult to properly detect unknown malware and a new malicious URLs.

There is also a technique that detects an attack based on unnaturalness of header information of an email. This technique decides whether or not an email is a fraudulent email, based on information such as an authentication result of a sender's sending domain, a sending route, employed email software, and a country through which the email was sent. However, this technique cannot detect a spoofed email that uses a legitimate user's account.

Non-Patent Literature 1 describes a technique of detecting a spoofed email.

In the technique described in Non-Patent Literature 1, emails sent out by a sender of an email are analyzed at a lexical level, a syntactic level, and a structural level, and a profile representing an individuality of the emails is created. The lexical level involves a number of words, a number of characters per word, a number of characters in the whole text, a number of characters per line, a number of lines, a number of sentences, a frequency of an individual character in the text, a frequency of a character used for sentence termination, and so on. The syntactic level involves a number of adjectives, a number of adverbs, a number of coordinate conjunctions, a number of past participles, and so on. The structural level involves information such as signature, address, and phone number, that identifies the author; the format of the greeting; how a sentence begins; how a sentence is terminated; and so on. How a sentence begins involves a number of capital letters, a number of lowercase letters, and so on. How a sentence is terminated involves a number of sentences that use a space to punctuate the sentences, a number of sentences that use a dot to punctuate the sentences, a number of sentences that use a punctuation mark other than a dot to punctuate the sentences, a number of sentences that use a space after the sentences are terminated, and so on.

In the technique described in Non-Patent Literature 1, a profile of the sender is created from the emails received from the sender in the past. When a newly received email does not match with the profile, it is determined as a spoofed email.

CITATION LIST

Non-Patent Literature

Non-Patent Literature 1: Sevtap Duman, Kubra Kalkan Cakmakciy, Manuel Egelez, William Robertson and Engin Kirda: "EmailProfiler: Spearphishing Filtering with Header and Stylometric Features of Emails", Computer Software and Applications Conference (COMPSAC), 2016 IEEE 40th Annual

SUMMARY OF INVENTION

Technical Problem

However, even using the technique described in Non-Patent Literature 1, it is not possible to detect spoofing in a case where an attacker is exactly imitating writing habits of a person to impersonate, and a case where a past email is appropriated unchanged.

An objective of the present invention is to make it possible to properly detect a targeted-attack email.

Solution to Problem

A fraudulent email decision device of the present invention includes:

an intention identification unit, with respect to a newly received incoming email as a subject email, to identify an intention of the subject email from a body of the subject email; and an email decision unit to decide whether or not the subject email is a fraudulent email, from a relationship between another incoming email received from a same sender as a sender of the subject email and an intention, identified by the intention identification unit, of the subject email.

Advantageous Effects of Invention

In the present invention, whether or not a subject email is a fraudulent email is decided from a relationship between an intention of the subject email and another incoming email received from the same sender as the sender of the subject email. This makes it possible to properly detect a targeted-attack email.

BRIEF DESCRIPTION OF DRAWINGS

FIG. 14 is a flowchart of a processing of a rule application unit 242 and email decision unit 243 according to Embodiment 1.

FIG. 15 is a diagram illustrating rules registered in a consistency decision rule 244 according to Embodiment 1.

FIG. 16 is a diagram illustrating function terms and rules applied per email type according to Embodiment 1.

FIG. 20 is a flowchart of a processing of an intention estimation unit 246 according to Embodiment 2.

DESCRIPTION OF EMBODIMENTS

Embodiment 1

\*\*\*Description of Configuration\*\*\*

Figure 1:
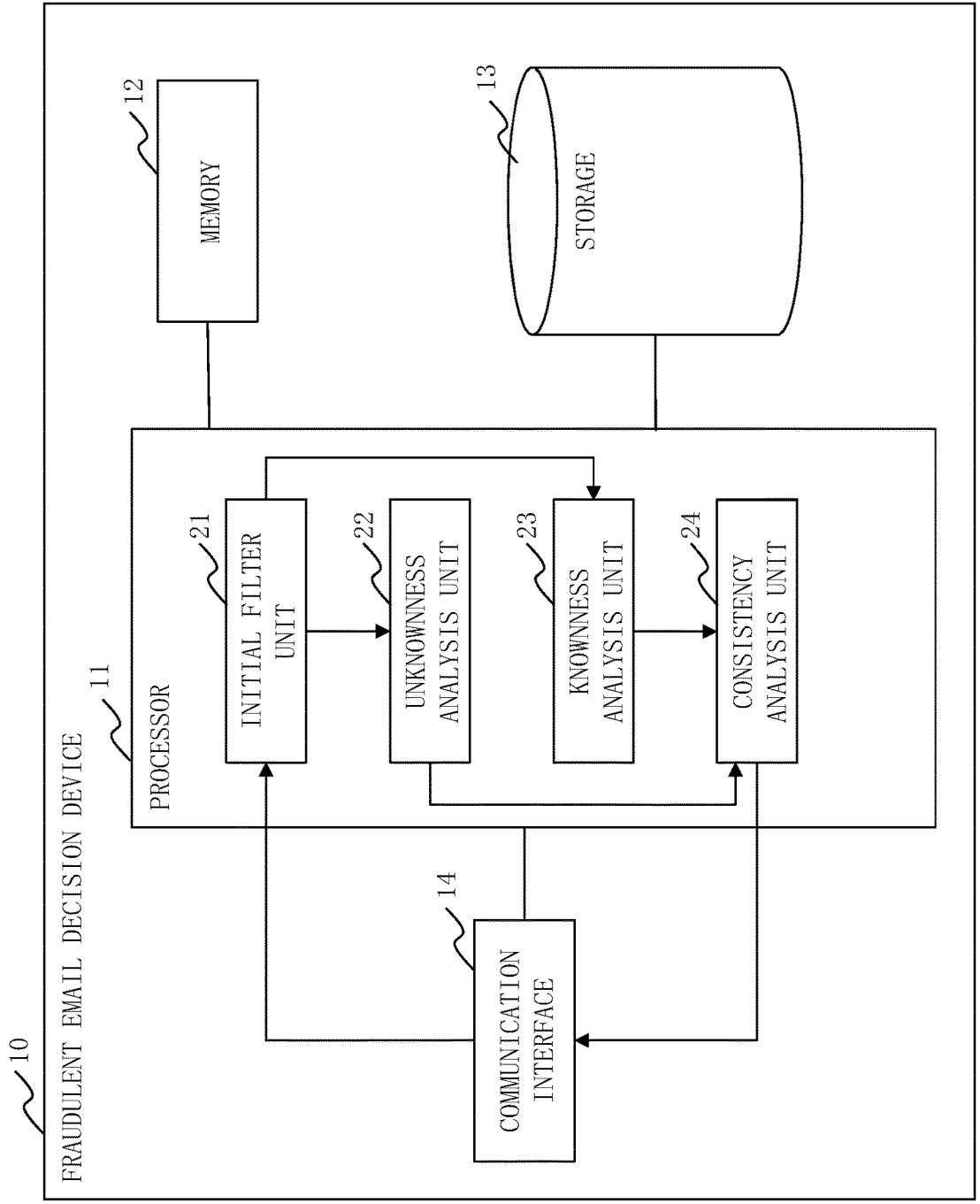
FIG. 1 is a configuration diagram of a fraudulent email decision device 10 according to Embodiment 1.

A configuration of a fraudulent email decision device 10 according to Embodiment 1 will be described with referring to FIG. 1.

The fraudulent email decision device 10 is a computer.

The fraudulent email decision device 10 is provided with hardware devices which are a processor 11, a memory 12, a storage 13, and a communication interface 14. The processor 11 is connected to the other hardware devices via signal lines and controls these other hardware devices.

The processor 11 is an Integrated Circuit (IC) that performs processing. Specific examples of the processor 11 are a Central Processing Unit (CPU), a Digital Signal Processor (DSP), and a Graphics Processing Unit (GPU).

The memory 12 is a storage device that stores data temporarily. Specific examples of the memory 12 are a Static Random-Access Memory (SRAM) and a Dynamic Random-Access Memory (DRAM).

The storage 13 is a storage device that stores data. A specific example of the storage 13 is a Hard Disk Drive (HDD). Alternatively, the storage 13 may be a portable recording medium such as a Secure Digital (SD; registered trademark) memory card, a CompactFlash (registered trademark; CF), a NAND flash, a flexible disk, an optical disk, a compact disk, a blu-ray (registered trademark) disk, and a Digital Versatile Disk (DVD).

The communication interface 14 is an interface to communicate with an external device. Specific examples of the communication interface 14 are an Ethernet (registered trademark) port, a Universal Serial Bus (USB) port, and a High-Definition Multimedia Interface (HDMI; registered trademark) port.

The fraudulent email decision device 10 is provided with an initial filter unit 21, an unknownness analysis unit 22, a knownness analysis unit 23, and a consistency analysis unit 24, as function constituent elements. Functions of the individual function constituent elements of the fraudulent email decision device 10 are implemented by software.

A program that implements the functions of the individual function elements of the fraudulent email decision device 10 is stored in the storage 13. This program is read into the memory 12 by the processor 11 and executed by the processor 11. Thus, the functions of the individual function constituent elements of the fraudulent email decision device 10 are implemented.

Figure 2:
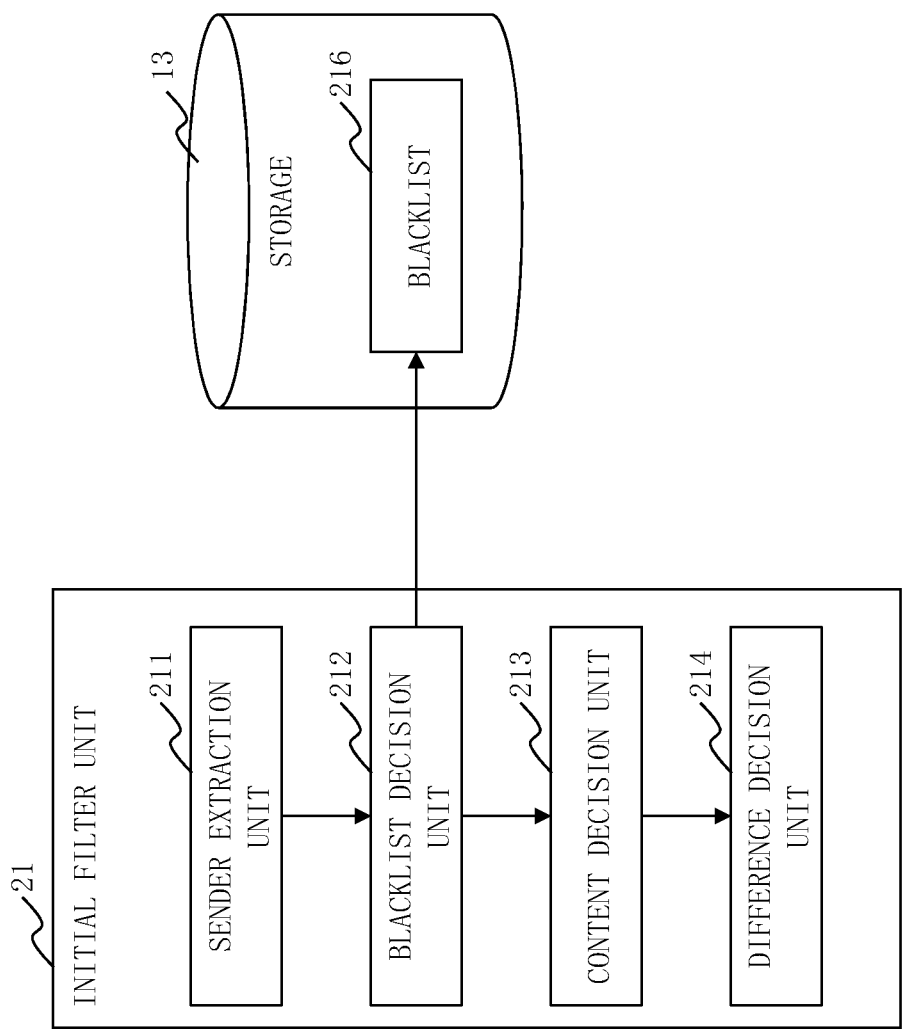
FIG. 2 is a configuration diagram of an initial filter unit 21 according to Embodiment 1.

A configuration of the initial filter unit 21 according to Embodiment 1 will be described with referring to FIG. 2.

The initial filter unit 21 is provided with a sender extraction unit 211, a blacklist decision unit 212, a content decision unit 213, and a difference decision unit 214, as function constituent elements. The initial filter unit 21 uses a blacklist 216 stored in the storage 13.

Figure 3:
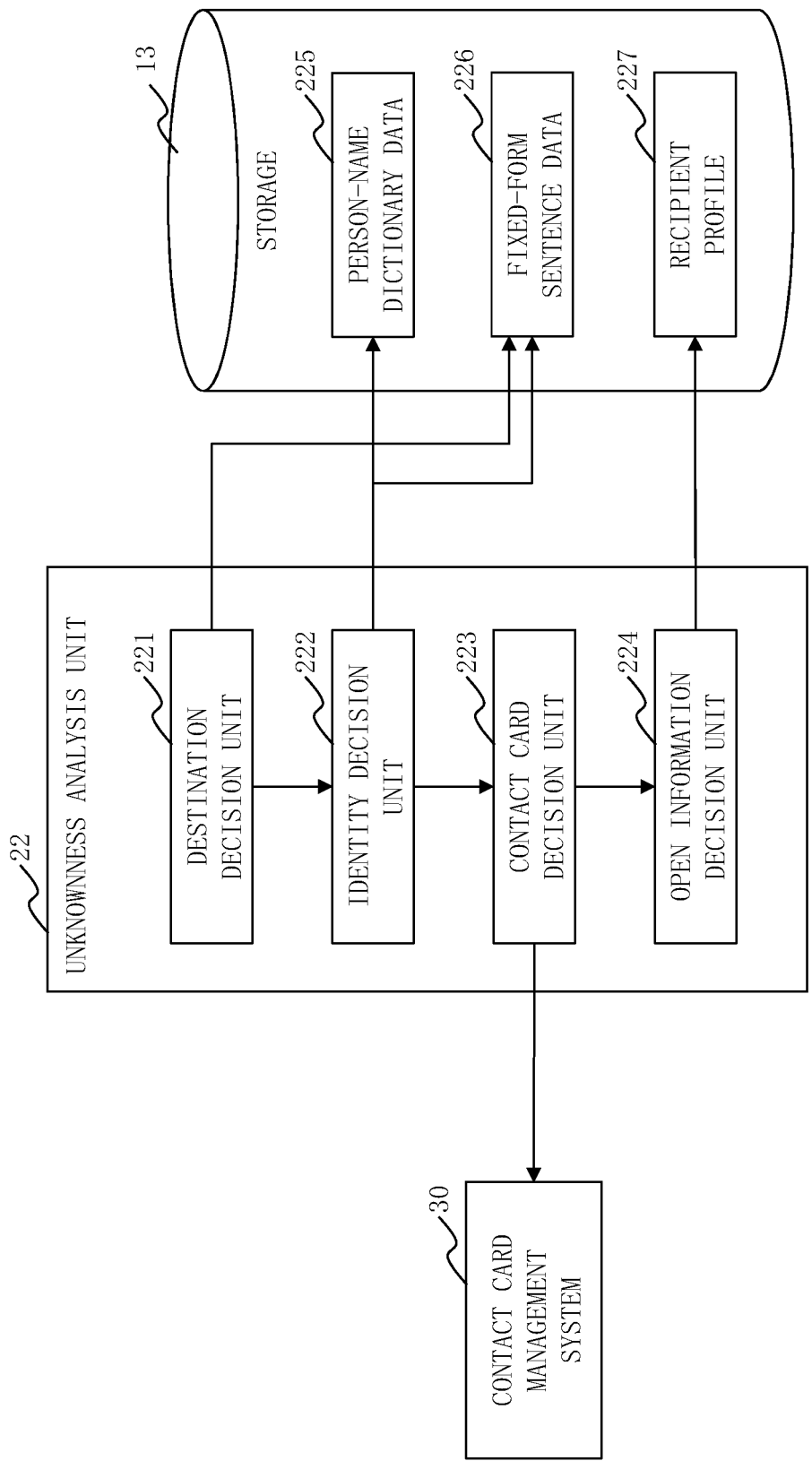
FIG. 3 is a configuration diagram of an unknownness analysis unit 22 according to Embodiment 1.

A configuration of the unknownness analysis unit 22 according to Embodiment 1 will be described with referring to FIG. 3.

The unknownness analysis unit 22 is provided with a destination decision unit 221, an identity decision unit 222, a contact card decision unit 223, and an open information decision unit 224, as function constituent elements. The unknownness analysis unit 22 uses person-name dictionary data 225, fixed-form sentence data 226, and a recipient profile 227 which are stored in the storage 13. The unknownness analysis unit 22 also uses a contact card management system 30 connected via the communication interface 14.

Figure 4:
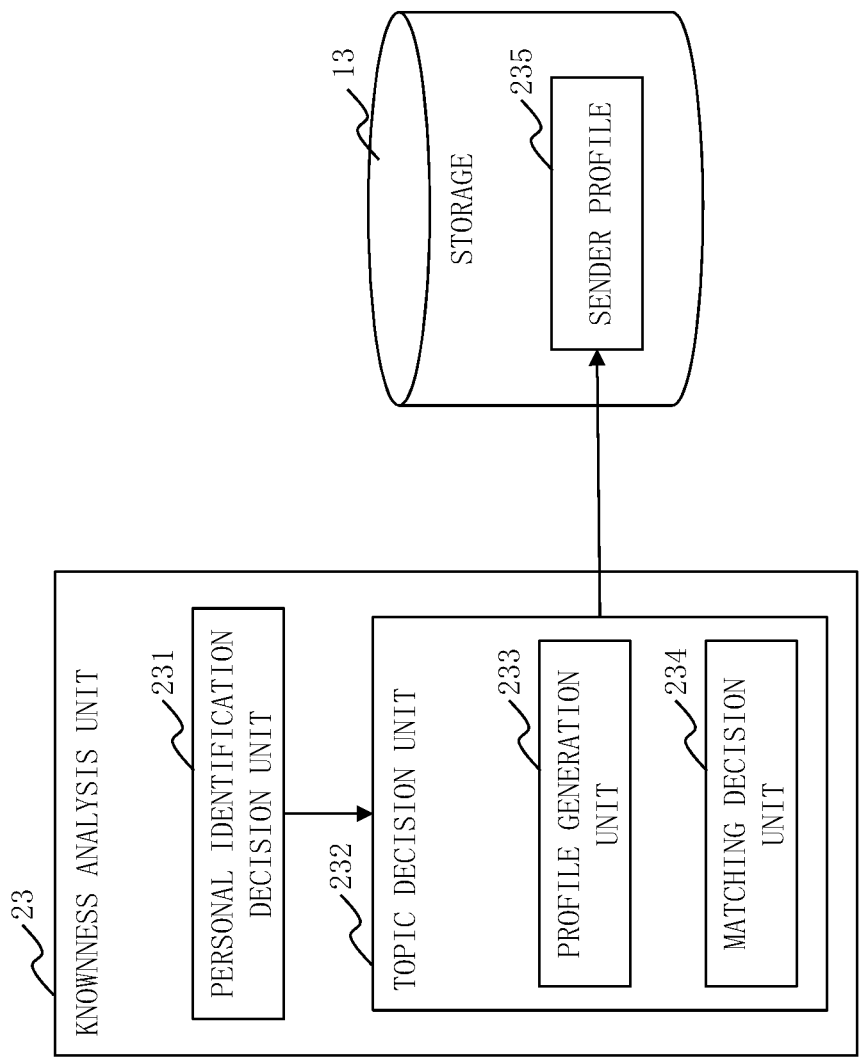
FIG. 4 is a configuration diagram of a knownness analysis unit 23 according to Embodiment 1.

A configuration of the knownness analysis unit 23 according to Embodiment 1 will be described with referring to FIG. 4.

The knownness analysis unit 23 is provided with a personal identification decision unit 231 and a topic decision unit 232 as function constituent elements. The topic decision unit 232 is provided with a profile generation unit 233 and a matching decision unit 234. The knownness analysis unit 23 uses a sender profile 235 stored in the storage 13.

A configuration of the consistency analysis unit 24 according to Embodiment 1 will be described with referring to FIG. 5.

The consistency analysis unit 24 is provided with an intention identification unit 241, a rule application unit 242, and an email decision unit 243, as function constituent elements. The consistency analysis unit 24 uses a consistency decision rule 244 stored in the storage 13.

In FIG. 1, only one processor 11 is illustrated. However, there may be a plurality of processors 11. The plurality of processors 11 may cooperate with each other to execute the program that implements the individual functions.

\*\*\*Description of Operations\*\*\*

Operations of the fraudulent email decision device 10 according to Embodiment 1 will be described with referring to FIGS. 6 to 16.

The operations of the fraudulent email decision device 10 according to Embodiment 1 correspond to a fraudulent email decision method according to Embodiment 1. The operations of the fraudulent email decision device 10 according to Embodiment 1 also correspond to a processing of a fraudulent email decision program according to Embodiment 1.

Also, an overall processing of the fraudulent email decision device 10 according to Embodiment 1 will be described with referring to FIGS. 1 and 6.

(Step S1: Initial Filter Process)

The initial filter unit 21, with respect to a newly received incoming email as an analysis-target subject email, confirms whether an apparently fraudulent feature is included in the subject email. If an apparently fraudulent feature is included, the initial filter unit 21 excludes the subject email from processes of step S2 and beyond, as a fraudulent email.

(Step S2: Knownness Decision Process)

The initial filter unit 21 decides whether a sender of the subject email is an unknown sender with whom no email transaction was made in the past, or a known sender with whom email transaction was made in the past.

If the sender of the subject email is an unknown sender, the initial filter unit 21 advances the processing to step S3. On the other hand, if the sender of the subject email is a known sender, the initial filter unit 21 advances the processing to step S4.

(Step S3: Unknownness Analysis Process)

The unknownness analysis unit 22 decides whether or not the subject email is an email that has a feature unsuitable for an email from a party to exchange emails with for the first time. If the subject email is an email that has an unsuitable feature, the unknownness analysis unit 22 excludes the subject email from the process of step S5, as being a fraudulent email.

(Step S4: Knownness Analysis Process)

The knownness analysis unit 23 decides whether or not a topic of the subject email is a topic that has been discussed in the past with the sender of the subject email.

(Step S5: Consistency Analysis Process)

The consistency analysis unit 24 analyzes consistency of the email transaction from a relationship between the subject email and an email received in the past from the sender of the subject email. If the email transaction includes contradiction, the consistency analysis unit 24 decides that the subject email is a fraudulent email.

Figure 7:
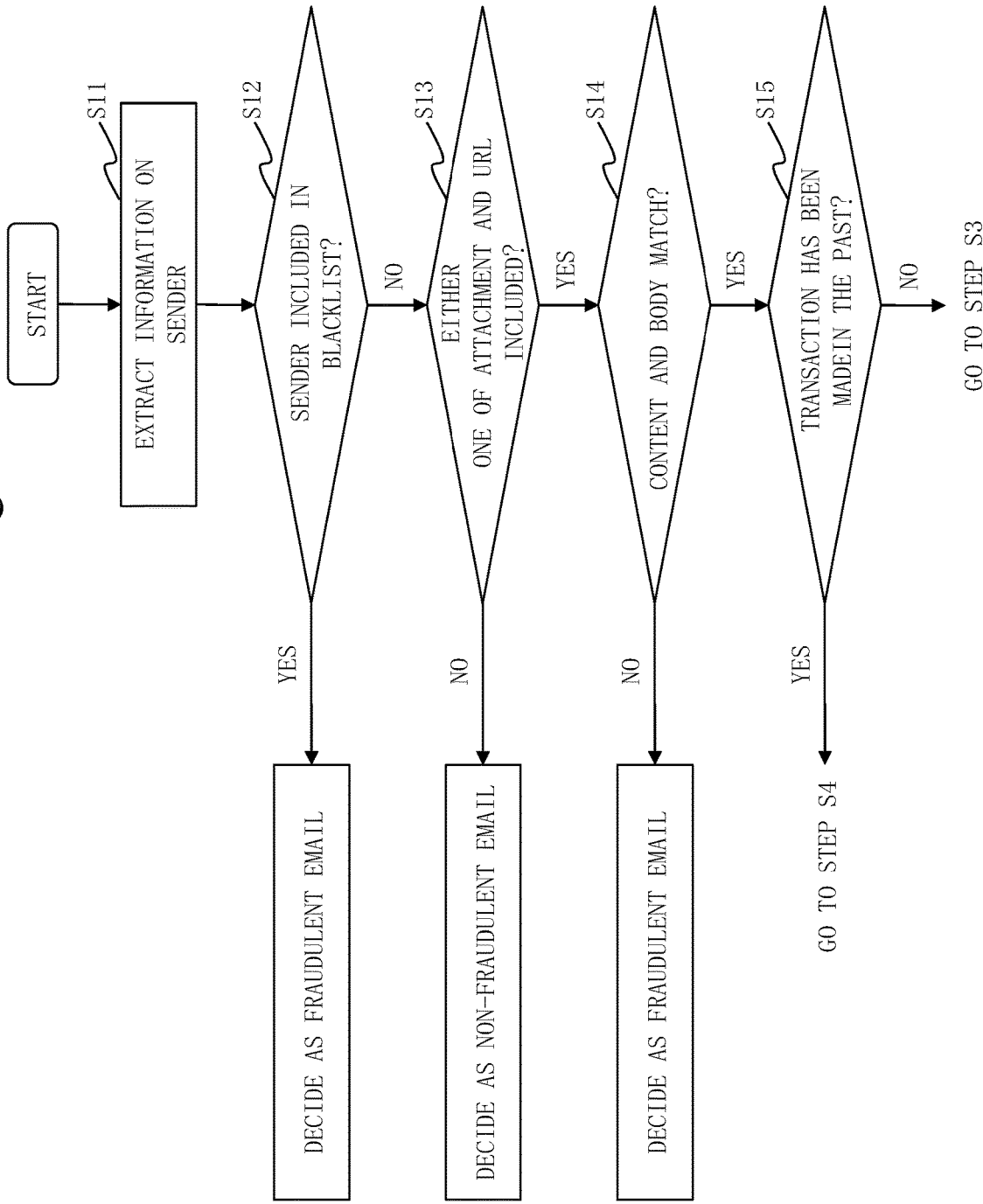
FIG. 7 is a flowchart of a processing of the initial filter unit 21 according to Embodiment 1.

A processing of the initial filter unit 21 according to Embodiment 1 will be described with referring to FIGS. 2 and 7.

Figure 6:
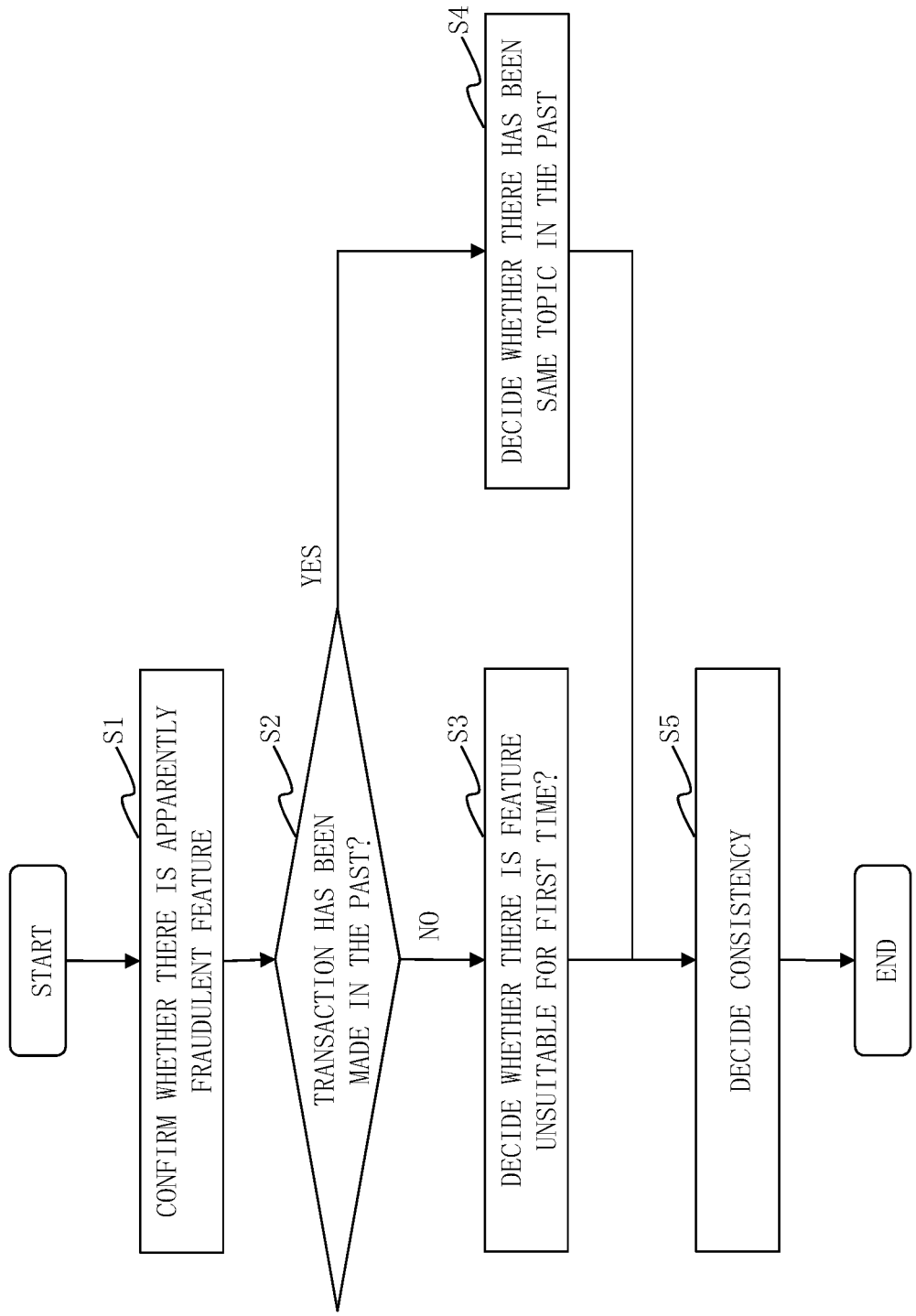
FIG. 6 is a flowchart of an overall processing of the fraudulent email decision device 10 according to Embodiment 1.

The processing of the initial filter unit 21 corresponds to processes of step S1 and step S2 of FIG. 6. Specifically, processes of step S11 to step S14 correspond to a process of step S1 of FIG. 6. A process of step S15 corresponds to a process of step S2 of FIG. 6.

(Step S11: Sender Extraction Process)

The sender extraction unit 211 extracts information on the sender of the subject email. Specifically, the sender extraction unit 211 extracts information of "From" field and information of "Received" field from header information of the subject email, as information on the sender and information on a server through which the subject email was sent.

(Step S12: Blacklist Decision Process)

The blacklist decision unit 212 decides whether or not at least either one of the sender and the server through which the subject email was sent, the sender and the server being extracted in step S11, is included in the blacklist 216. The blacklist 216 is created beforehand. The blacklist 216 may be added each time a sender who is sending a fraudulent email is found.

If at least either one of the sender and the server through which the subject email was sent is included in the blacklist 216, the blacklist decision unit 212 decides that the subject email is a fraudulent email, and ends the processing. On the other hand, if the sender and the server through which the subject email was sent is not included in the blacklist 216, the blacklist decision unit 212 advances the processing to step S13.

(Step S13: Content Decision Process)

The content decision unit 213 decides whether at least either one of an attachment and a URL is included in the subject email.

If none of an attachment and a URL is included, the content decision unit 213 decides that the subject email is not a fraudulent email, and ends the processing. On the other hand, if at least either one of an attachment and a URL is included, the content decision unit 213 advances the processing to step S14.

(Step S14: Difference Decision Process)

The difference decision unit 214, with respect to one of the attachment and the URL that is decided in step S13 as being included, as a subject, decides whether or not a content of the subject matches with a content of a body of the email. Specifically, if an attachment is the subject, the difference decision unit 214 decides whether or not the content of the attachment matches with the content of the body. On the other hand, if an URL is the subject, the difference decision unit 214 decides whether or not the content of a Web site indicated by the URL matches with the content of the body. To decide whether or not the content matches with the content of the body, it is possible to employ a technique described in a literature by Hiroki NISHIKAWA, Takumi YAMAMOTO, Kiyoto KAWAUCHI, "Detection method what suspicious email is based on email context", Computer Security Symposium 2017, 1B3-3.

If there is no consistency, the difference decision unit 214 decides that the subject email is a fraudulent email, and ends the processing. On the other hand, if there is consistency, the difference decision unit 214 advances the processing to step S15.

(Step S15: Knownness Decision Process)

A knownness decision unit 215 decides whether or not the sender of the subject email is included among the senders of the past incoming emails, thereby deciding whether the sender of the subject email is an unknown sender or a known sender.

Specifically, the knownness decision unit 215 searches for the sender of the subject email from sender email addresses or sender names in "From" fields of all the past emails stored in the storage 13. The past emails may be stored in the storage 13 or may be stored in an external storage device connected via the communication interface 14. If the sender of the subject email is not found, the knownness decision unit 215 decides that the sender of the subject email is an unknown sender, and advances the processing to step S3 of FIG. 6. On the contrary, if the sender of the subject email is found, the knownness decision unit 215 decides that the sender of the subject email is a known sender, and advances the processing to step S4 of FIG. 6.

Figure 8:
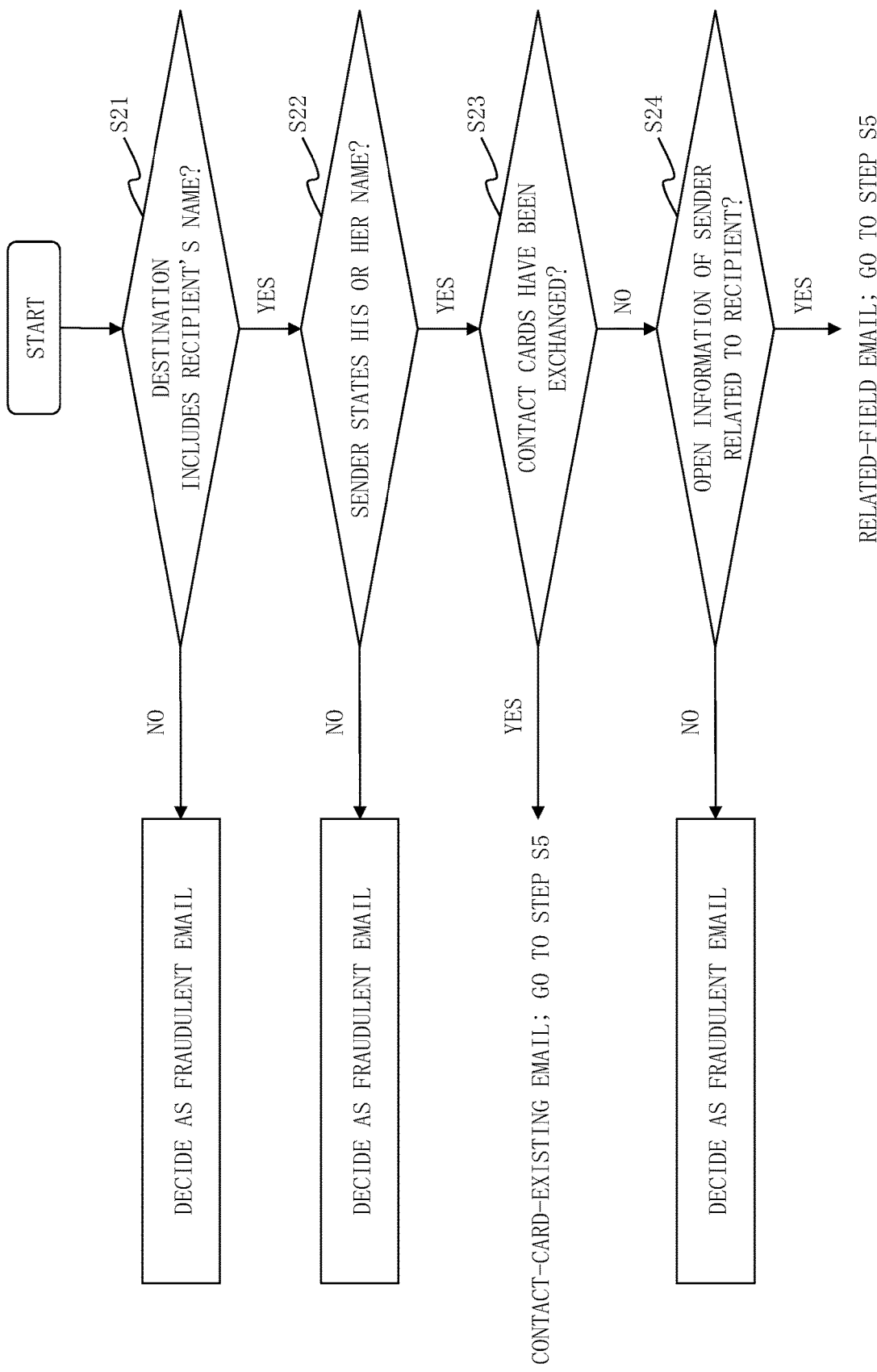
FIG. 8 is a flowchart of a processing of the unknownness analysis unit 22 according to Embodiment 1.

A processing of the unknownness analysis unit 22 according to Embodiment 1 will be described with referring to FIGS. 3 and 8.

The processing of the unknownness analysis unit 22 corresponds to the process of step S3 of FIG. 6.

(Step S21: Destination Decision Process)

The destination decision unit 221 decides whether or not the destination of the body of the subject email includes the name of the recipient of the subject email. Specifically, when the subject email is an English email, the destination decision unit 221 decides whether or not a description of the destination such as "Dear Mr. Suzuki" at the beginning of the body includes the name of the recipient. The destination decision unit 221 refers to the fixed-form sentence data 226 indicating typical description styles of a destination and so on, to identify description of the destination. Assume that the name of the recipient is stored in advance in the memory 12 or the like.

If the name of the recipient is not included, the destination decision unit 221 decides that the subject email is a fraudulent email, and ends the processing. On the other hand, if the name of the recipient is included, the destination decision unit 221 advances the processing to step S22. There is a case where the subject email contains a plurality of destinations as in a case where the subject email is addressed to a mailing list. Hence, fixed-form sentences such as "dear all", "dear folks", and "dear person who may concern" are registered in advance. In this case, the subject email is not decided as a fraudulent email even if the destinations do not include the name of the recipient.

(Step S22: Identity Decision Process)

The identity decision unit 222 decides whether or not the sender of the subject email states his or her name in the body. Specifically, the identity decision unit 222 searches the body for a name other than the name of the recipient. In this case, the identity decision unit 222 refers to the person-name dictionary data 225 to search the body for the name other than the name of the recipient. Also, the identity decision unit 222 may refer to the fixed-form sentence data 226 to search the body for a typical description style that is employed when the sender states his or her name by saying, for example, "My name is XX", "I'm XX", and signature, thereby finding a name not listed in the person-name dictionary data 225.

If the sender does not state his or her name in the body, the identity decision unit 222 decides that the subject email is a fraudulent email, and ends the processing. On the other hand, if the sender states his or her name in the body, the identity decision unit 222 advances the processing to step S23.

(Step S23: Contact Card Decision Process)

The contact card decision unit 223 decides whether or not the recipient has exchanged contact cards with the sender of the subject email. Specifically, if the name of the sender of the subject email is registered in the contact card management system 30 connected via the communication interface 14, the contact card decision unit 223 decides that the recipient has exchanged contact cards with the sender. The contact card management system 30 is an external system that manages contact cards. The contact card decision unit 223 may decide whether or not someone of an organization the recipient belongs to, not the recipient, has exchanged contact cards with the sender.

If contact cards have been exchanged, the contact card decision unit 223 decides that the subject email is a contact-card-existing email, and advances the processing to step S5 of FIG. 6. On the other hand, if exchange of contact cards has not been made, the contact card decision unit 223 advances the processing to step S24.

(Step S24: Open Information Decision Process)

The open information decision unit 224 decides whether or not open information concerning the sender of the subject email includes a content related to the recipient.

Specifically, the open information decision unit 224 utilizes an Open Source Intelligence (OSINT) tool to collect open information concerning the sender of the subject email. The open information decision unit 224 decides whether or not the open information includes a content related to the recipient, based on whether or not the collected open information includes the information registered in the recipient profile 227. In the recipient profile 227, words concerning matters such as business, project, and hobby of the recipient are registered in advance in the form of a list.

According to a specific example, with respect to a Web page collected by OSINT, the open information decision unit 224 uses a keyword extraction technique such as Term Frequency-Inverse Document Frequency (TF-IDF) to extract a keyword of the page. Then, the open information decision unit 224 uses a word similarity calculating technique such as Word2Vec, to calculate a similarity between the keyword and a word in the profile. If a first reference number or more of pairs whose calculated similarity is equal to a first threshold or more are included, the open information decision unit 224 decides that the collected open information includes the information registered in the recipient profile 227, and concludes that the content of the open information is related to the recipient. On the other hand, if the first reference number or more of pairs whose calculated similarity is equal to the first threshold or more are not included, the open information decision unit 224 decides that the collected open information does not include the information registered in the recipient profile 227, and concludes that the content of the open information is not related to the recipient.

When the content of the open information is related to the recipient, the open information decision unit 224 decides that the subject email is a related-field email, and advances the processing to step S5 of FIG. 6. On the other hand, when the content of the open information is not related to the recipient, the open information decision unit 224 decides that the subject email is a fraudulent email, and ends the processing.

Figure 9:
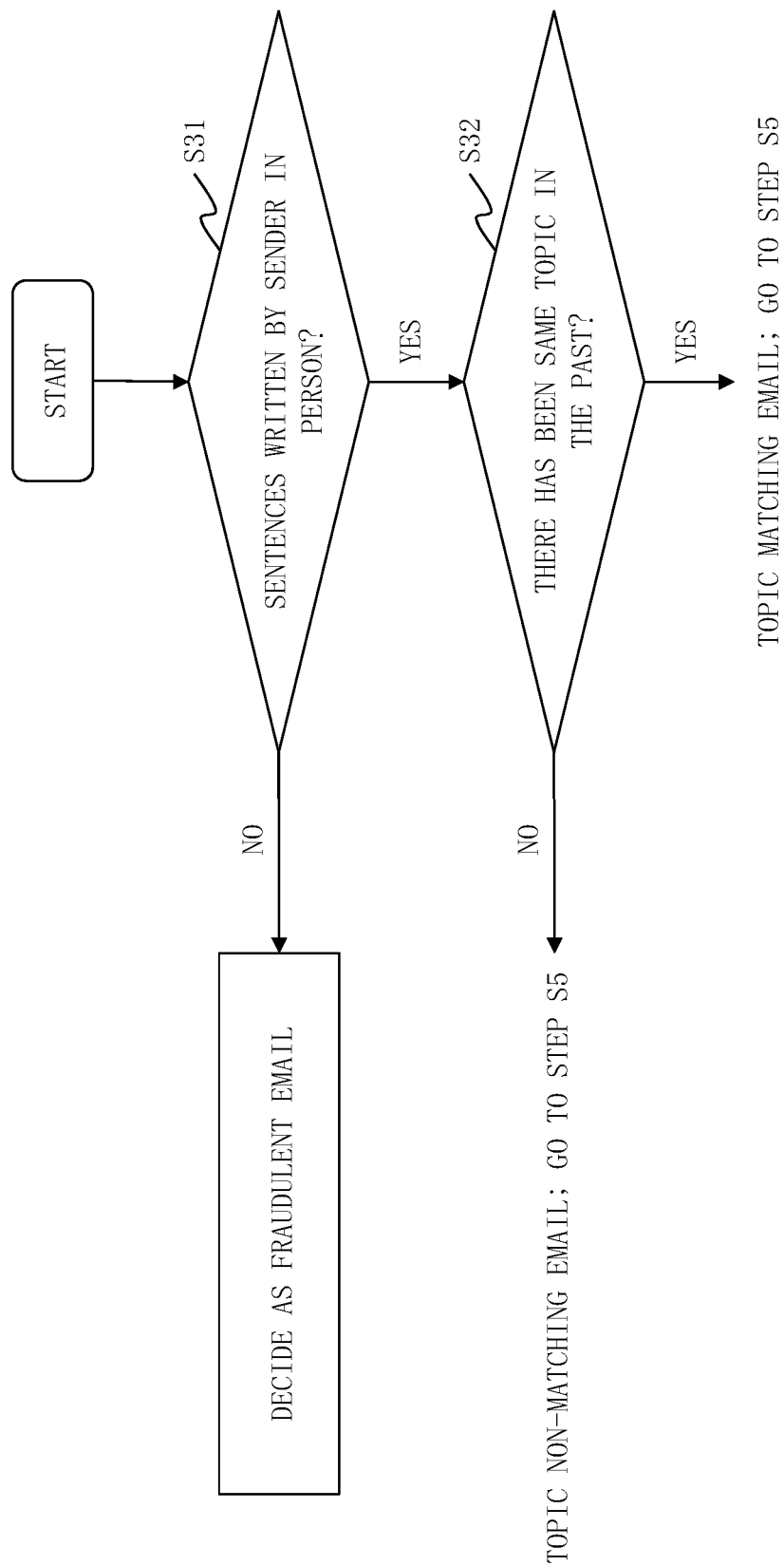
FIG. 9 is a flowchart of a processing of the knownness analysis unit 23 according to Embodiment 1.

A processing of the knownness analysis unit 23 according to Embodiment 1 will be described with referring to FIGS. 4 and 9.

The processing of the knownness analysis unit 23 corresponds to the process of step S4 of FIG. 6.

(Step S31: Personal Identification Decision Process)

The personal identification decision unit 231 decides from the style of the body of the subject email whether or not the body is written by the sender in person. Specifically, the personal identification decision unit 231 uses the technique described in Non-Patent Literature 1 and so on to decide whether or not the body is written by the sender in person.

If the body is not written by the sender in person, the personal identification decision unit 231 decides that the subject email is a fraudulent email, and ends the processing. On the other hand, if the body is written by the sender in person, the personal identification decision unit 231 advances the processing to step S32.

(Step S32: Topic Decision Process)

The topic decision unit 232 decides whether or not the topic of the subject email is included in another incoming email received from the same sender as the sender of the subject email. In other words, the topic decision unit 232 decides whether or not the topic of the subject email is a topic that has been discussed in the past between the recipient and the sender.

If the topic of the subject email is included in another incoming email, the topic decision unit 232 decides that the subject email is a topic matching email, and advances the processing to step S5 of FIG. 6. On the other hand, if the topic of the subject email is not included in another incoming email, the topic decision unit 232 decides that the subject email is a topic non-matching email, and advances the processing to step S5 of FIG. 6.

The topic decision process (step S32 of FIG. 9) according to Embodiment 1 will be described in detail with referring to FIGS. 4, 10, and 11. The topic decision process includes a processing of the profile generation unit 233 and a processing of the matching decision unit 234.

First, a processing of the profile generation unit 233 according to Embodiment 1 will be described with referring to FIGS. 4 and 10.

(Step S41: First Body-Extraction Process)

The profile generation unit 233 extracts the bodies from all the past incoming emails.

(Step S42: First Feature-Extraction Process)

The profile generation unit 233 extracts features from the bodies of the individual incoming emails extracted in step S41. The features may include a topic selection probability that uses Latent Dirichlet Allocation (LDA) and a keyword based on TF-IDF.

(Step S43: Clustering Process)

The profile generation unit 233 clusters the past incoming emails into a plurality of clusters according to the features extracted in step S42. The profile generation unit 233 may use, as a clustering algorithm, an existing technique such as KMEANS and Density-based spatial clustering of applications with noise (DBSCAN).

(Step S44: Labelling Process)

The profile generation unit 233, with respect to the incoming emails clustered into the plurality of clusters in step S43, as learning data, assigns discriminators of the clusters which the incoming emails belong to, to the learning data as labels of the incoming emails.

(Step S45: Learning Process)

The profile generation unit 233 performs supervised learning based on the learning data labelled in step S44. As a supervised learning algorithm, an existing scheme such as SVM and random forest may be employed. Hence, a discrimination tool that discriminates which cluster the incoming email is classified as is generated.

Processes of step S46 to step S49 are executed on the sender of each incoming email as a subject.

(Step S46: Second Body-Extraction Process)

The profile generation unit 233 extracts the bodies from, among all the past incoming emails, incoming emails that are sent by the sender of the subject.

(Step S47: Second Feature-Extraction Process)

The profile generation unit 233 extracts features from the bodies of the individual incoming emails extracted in step S46, by the same method as that of step S42.

(Step S48: First Discrimination Process)

The profile generation unit 233, with respect to the individual incoming emails from which extraction has been done in step S46, as a subject, classifies the subject incoming emails, based on the discrimination tool generated in step S45 and the features extracted from the subject incoming emails in step S47. Then, the profile generation unit 233 assigns to the subject incoming emails the discriminators of the clusters which the subject incoming emails are classified into, as labels.

(Step S49: Profile Generation Process)

The profile generation unit 233 writes a list of labels assigned to the individual incoming emails from which extraction has been done in step S46, to the sender profile 235 as a profile of the subject sender.

A processing of the matching decision unit 234 according to Embodiment 1 will be described with referring to FIGS. 4 and 11.

(Step S51: Sender Extraction Process) The matching decision unit 234 extracts information on the sender of the subject email. The information on the sender is extracted by the same method as that of step S11 of FIG. 7. Note that the subject email will be denoted by M0. Also, a sender indicated by the extracted information on the sender will be denoted by P. That is, the sender of the subject email M0 will be denoted by P.

(Step S52: Sender Identification Process)

The matching decision unit 234 reads out a profile of the sender P from the sender profile 235.

(Step S53: Third Body-Extraction Process)

The matching decision unit 234 identifies, among all the past incoming emails, incoming emails about the sender P. The matching decision unit 234 extracts X of incoming emails from among the incoming emails about the identified P, in the order from the most recent one received, where X is an integer of 1 or more. The extracted X of incoming emails will be denoted by M1, . . . , MX in the order from the most recent one received.

The matching decision unit 234 extracts a body from the subject email M0 and bodies from the extracted X of incoming emails M1, . . . , MX.

(Step S54: Third Feature-Extraction Process)

Figure 10:
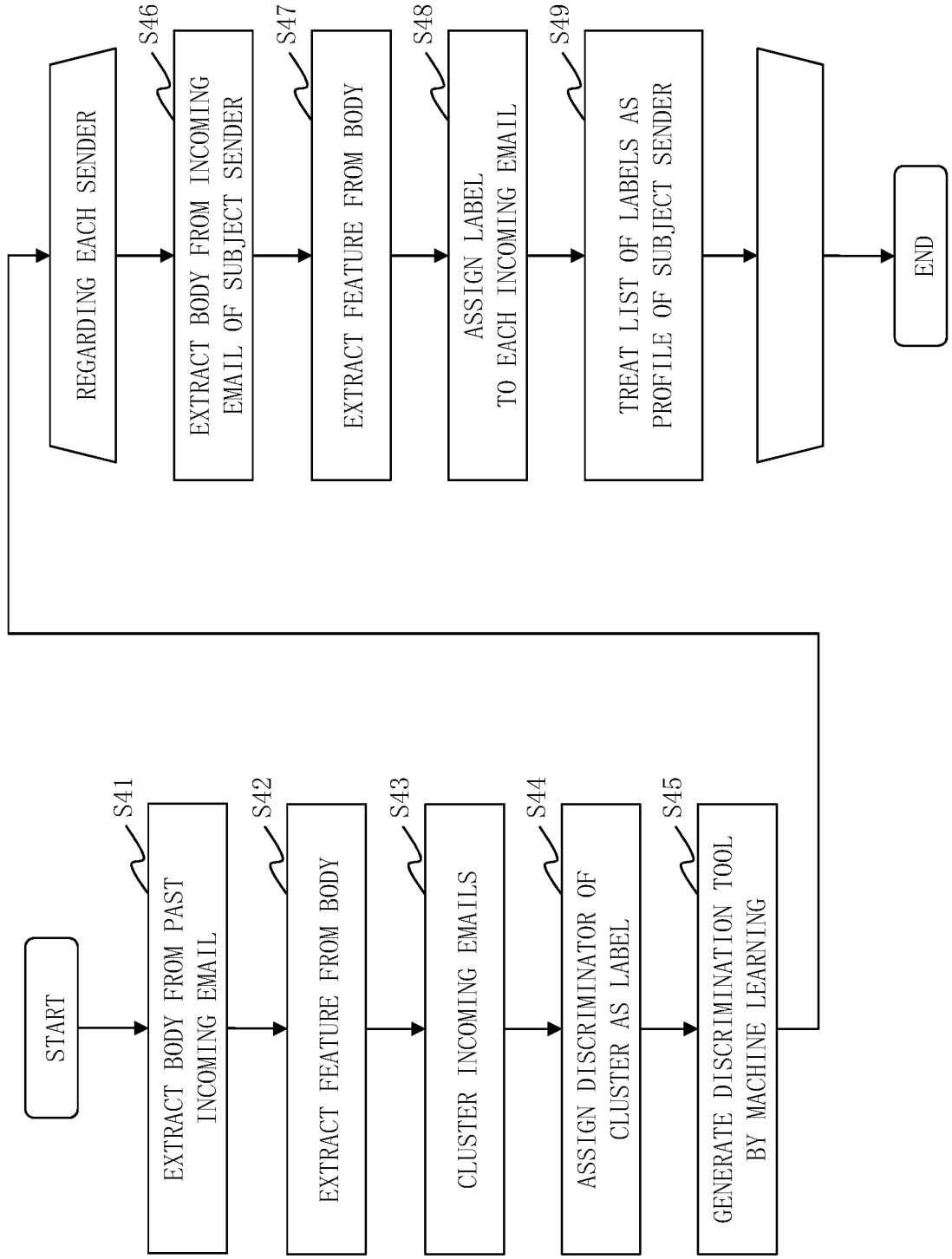
FIG. 10 is a flowchart of a processing of a profile generation unit 233 according to Embodiment 1.
Figure 11:
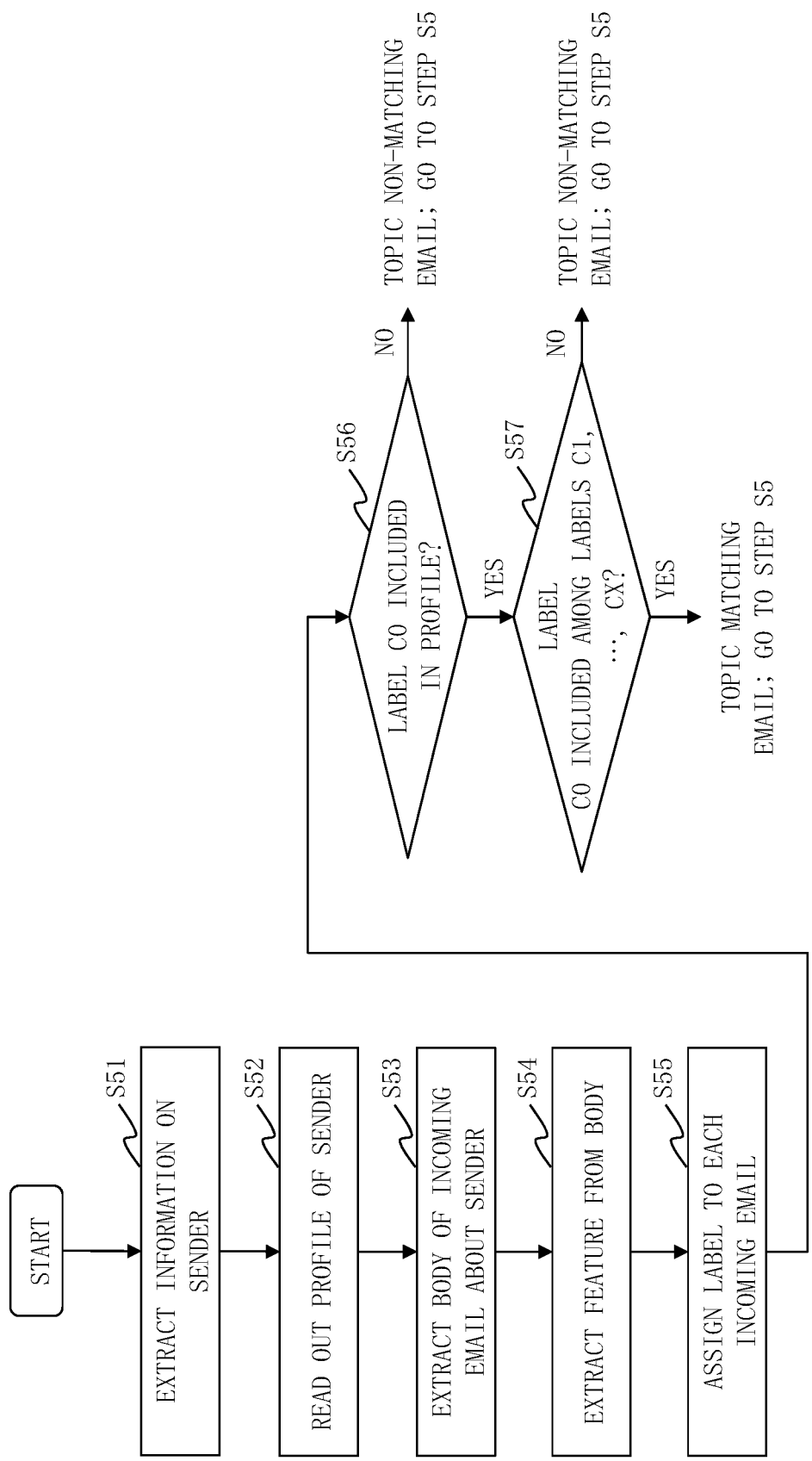
FIG. 11 is a flowchart of a processing of a matching decision unit 234 according to Embodiment 1.

The matching decision unit 234 extracts features from the bodies of the incoming emails M0, . . . , MX by the same method as that of step S42 of FIG. 10.

(Step S55: Second Discrimination Process)

The matching decision unit 234 classifies the subject email M0 and the incoming emails M1, . . . , MX, and assigns discriminators to the subject email M0 and the incoming emails M1, . . . , MX, as labels, in the same manner as in step S48 of FIG. 10. Note that the label assigned to the subject email M0 will be denoted by C0, and the labels assigned to the incoming emails M1, . . . , MX will be respectively denoted by C1, . . . , CX.

(Step S56: First Topic-Decision Process)

The matching decision unit 234 decides whether or not the label C0 assigned to the subject email M0 in step S55 is included in the profile about the sender P which is read out in step S52.

If the label C0 is not included in the profile, the matching decision unit 234 decides that the subject email is a topic non-matching email, and advances the processing to step S5 of FIG. 6. On the other hand, if the label C0 is included on the profile, the matching decision unit 234 advances the processing to step S57.

(Step S57: Second Topic-Decision Process)

The matching decision unit 234 decides whether or not the label C0 assigned to the subject email M0 in step S55 is included among the labels C1, . . . , CX assigned respectively to the incoming emails M1, . . . , MX in step S55.

If the label C0 is not included among the labels C1, . . . , CX, the matching decision unit 234 decides that the subject email is a topic non-matching email, and advances the processing to step S5 of FIG. 6. On the other hand, if the label C0 is included among the labels C1, . . . , CX, the matching decision unit 234 decides that the subject email is a topic matching email, and advances the processing to step S5 of FIG. 6.

A processing of the consistency analysis unit 24 according to Embodiment 1 will be described with referring to FIGS. 5 and 12.

As a result of execution of the processing of the initial filter unit 21, unknownness analysis unit 22, and knownness analysis unit 23, the subject emails have been classified into fraudulent emails, non-fraudulent emails, contact-card-existing emails, related-field emails, topic matching emails, and topic non-matching emails. When a subject email is classified as an email type of the contact-card-existing email, an email type of the related-field email, an email type of the topic matching email, or an email type of the topic non-matching email, the consistency analysis unit 24 decides whether or not the subject email is fraudulent.

(Step S61: Intention Identification Process)

The intention identification unit 241 identifies an intention of the subject email from the body of the subject email. The intention of the subject email is the reason the subject email was sent, which is, for example, forward, resend, forgot to attach, update, or answer. In Embodiment 1, the intention identification unit 241 extracts, from the body of the subject email, a word similar to a function term registered in advance, and identifies the intention expressed by the function term similar to the extracted word, as the intention of the subject email.

(Step S62: Rule Application Process)

The rule application unit 242 reads out a rule corresponding to the intention identified in step S61 and the email type of the subject email, from the consistency decision rule 244. Rules are registered in the consistency decision rule 244 in advance. Rules can be added as necessary to the consistency decision rule 244 in the form of plug-in or the like. The rules indicate conditions for deciding the subject email as a fraudulent email. As described above, the email type is one of the contact-card-existing email, the related-field email, the topic matching email, and the topic non-matching email.

(Step S63: Rule Decision Process)

The email decision unit 243 decides whether or not the subject email is a fraudulent email, from a relationship between the intention of the subject email identified in step S61 and another incoming email received from the same sender as the sender of the subject email.

Specifically, the email decision unit 243 decides whether or not the subject email is a fraudulent email, from the condition indicated by the rule read out in step S62, and another incoming email received from the same sender as the sender of the subject email.

Figure 13:
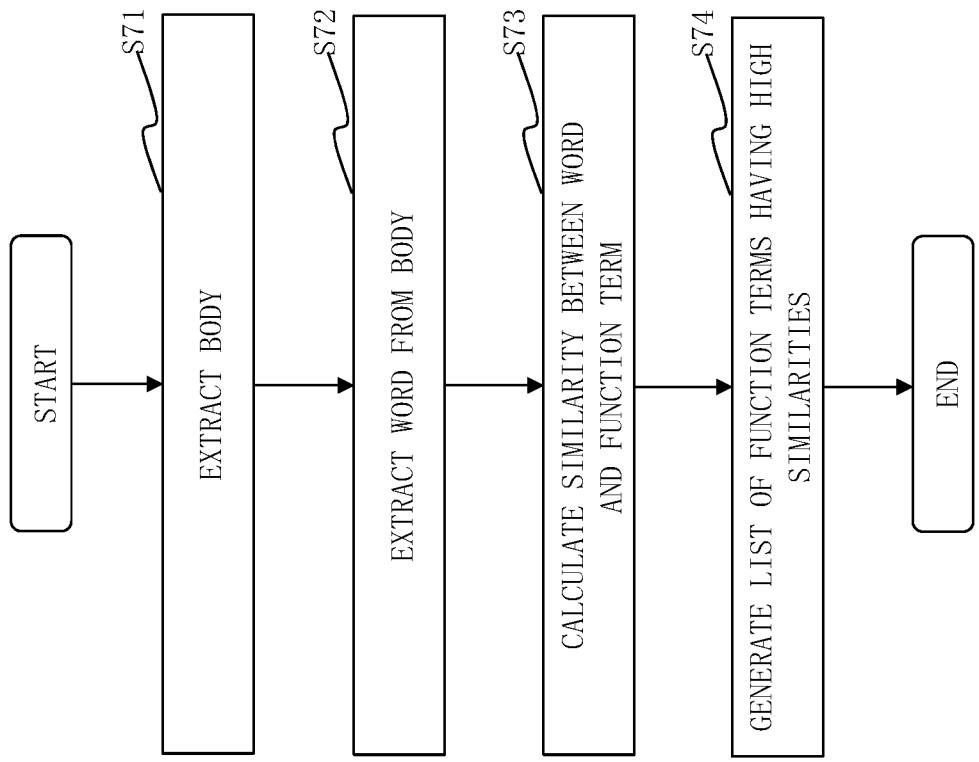
FIG. 13 is a flowchart of a processing of an intention identification unit 241 according to Embodiment 1.

A processing of the intention identification unit 241 according to Embodiment 1 will be described in detail with referring to FIGS. 5 and 13.

Figure 12:
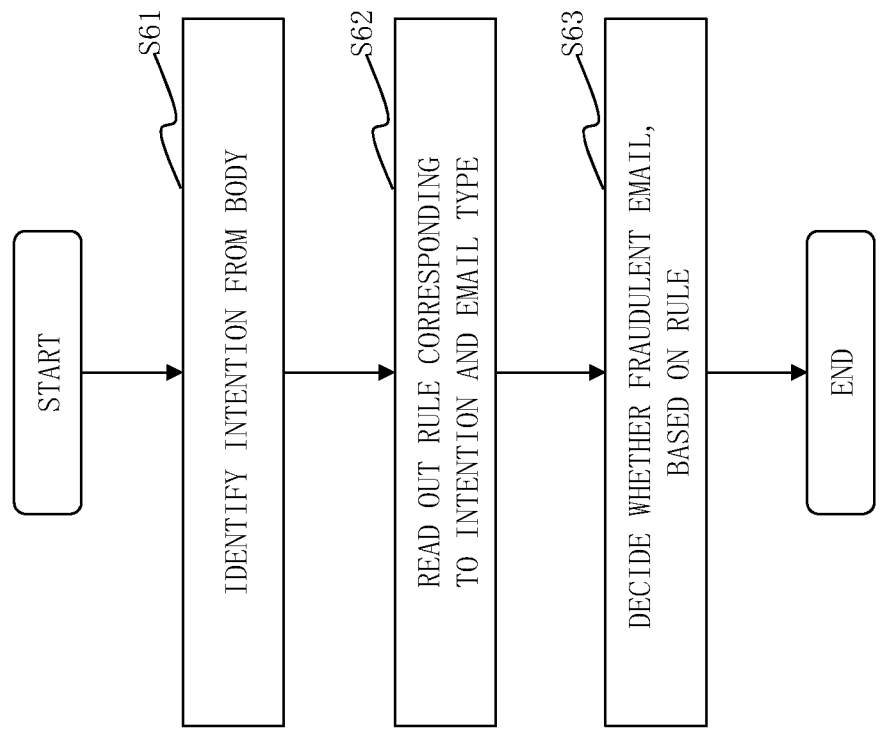
FIG. 12 is a flowchart of a processing of the consistency analysis unit 24 according to Embodiment 1.

The processing of the intention identification unit 241 corresponds to step S61 of FIG. 12.

(Step S71: Fourth Body-Extraction Process)

The intention identification unit 241 extracts the body from the subject email.

(Step S72: Word Extraction Process)

The intention identification unit 241 extracts a word from the body extracted in step S71. For example, the intention identification unit 241 performs morphological analysis on the body and extracts as a word some parts of speech such as a noun and a verb.

(Step S73: Similarity Calculation Process)

The intention identification unit 241, with respect to each word extracted in step S72 as a subject, calculates a similarity of the subject word with each function term. To calculate the similarity, a technique such as Word2Vec, which calculates a similarity of a word is used. The function terms are words each expressing the reason a subject email was sent, which are, for example, forward, resend, forgot to attach, update, and answer. The function terms are registered in advance. The function terms can be added as necessary as plug-in or the like.

(Step S74: Similarity Decision Process)

The intention identification unit 241 decides whether or not a second reference number or more of words each with a similarity calculated in step S73 that is equal to a second threshold or more are included.

If the second reference number or more of words each with a similarity that is equal to the second threshold or more are not included, the intention identification unit 241 decides that the subject email is not a fraudulent email, and ends the processing. On the other hand, if the second reference number or more of words each with a similarity that is equal to the second threshold or more are included, the intention identification unit 241 generates a list of function terms each determined as having a similarity that is equal to the second threshold or more with the word, and advances the processing to step S62 of FIG. 12.

Processes of the rule application unit 242 and email decision unit 243 according to Embodiment 1 will be described in detail with referring to FIGS. 5 and 14.

The processes of the rule application unit 242 and email decision unit 243 correspond to processes of step S62 and step S63 of FIG. 12.

(Step S81: List Decision Process)

The rule application unit 242 decides whether or not all the function terms in the list generated in step S74 are selected.

If all the function terms are selected, the rule application unit 242 decides that the subject email is not a fraudulent email, and ends the processing. On the other hand, if there is an unselected function term, the rule application unit 242 advances the processing to step S82.

(Step S82: Function Term Selection Process)

The rule application unit 242 selects one unselected function term from the list.

(Step S83: Rule Readout Process)

The rule application unit 242 reads out a rule corresponding to the function term selected in step S82 and the email type of the subject email, from the consistency decision rule 244.

(Step S84: Rule Decision Process)

The email decision unit 243 decides whether or not the subject email is a fraudulent email, from the condition indicated by the rule read out in step S83 and another incoming email received from the same sender as the sender of the subject email. In this connection, if the subject email or another incoming email satisfies the condition indicated by the rule, the email decision unit 243 decides that the subject email is a fraudulent email. On the other hand, if the subject email and another incoming email do not satisfy the condition indicated by the rule, the email decision unit 243 decides that the subject email is not a fraudulent email.

Examples of the rules registered in the consistency decision rule 244 will be described with referring to FIGS. 15 and 16.

FIG. 15 illustrates seven rules of rule 1 to rule 7. FIG. 16 illustrates rules applied per function terms and email type. FIG. 16 illustrates rules for email types which are the contact-card-existing email and the related-field email. Rules are set likewise for email types which are the topic matching email and the topic non-matching email.

For example, when a contact-card-existing email includes a word related to a function term "resend", rule 1 is applied.

Rule 1 is a rule that decides a subject email as a fraudulent email if a body of the subject email includes a function term. The process of step S84 of FIG. 14 is executed only when the body of the subject email includes a function term. Hence, when rule 1 is applied, the subject email is always decided as a fraudulent email. This is because it is unnatural if an email is suddenly "resent" from a person with whom no regular transaction is made.

For example, when a contact-card-existing email includes a word related to a function term "forward", rule 2 is applied.

According to rule 2, the email decision unit 243 extracts a topic and a keyword from the body of the subject email, a content of an attachment, and a content of the URL, and decides whether or not the topic matches with a topic of an email exchanged with the sender in the past. Whether a topic matches or not is decided by a method that is the same as the processing of the matching decision unit 234. If the topic does not match, the subject email is decided as a fraudulent email. This is because it is unnatural if information on a non-related topic is suddenly sent from a person with whom no regular email transaction is made.

For example, if a related-field email includes a word concerning the function term "resend", rule 3 or rule 4 is applied.

According to rule 3, the email decision unit 243 decides whether or not an email with the same content has been sent from the same sender immediately previously. If such an email has not been sent, the related-field email is decided as a fraudulent email. This is because it is unnatural if an email having the same content has not been sent in the past prior to an email notifying resend. Decision of whether an email has the same content or not can be done by deciding that an email includes sentences of the same content if its similarity is equal to a threshold or more, utilizing an existing technique such as Doc2Vec.

According to rule 4, the email decision unit 243 decides whether or not the same email being sent from the same sender immediately previously has the same attachment. If the same email has a different attachment, the email decision unit 243 decides that the related-field email is a fraudulent email. This is because it is unnatural if an email is sending a different attachment in spite of being a resent email.

For example, when a related-field email includes a word concerning a function term "forget to attach", rule 3 or rule 5 is applied.

According to rule 5, the email decision unit 243 decides whether or not the same email being sent from the same sender immediately previously has the same attachment. If the same attachment is attached, the email decision unit 243 decides that the related-field email is a fraudulent email. This is because it is unnatural if an attachment is attached despite that it should have been forgotten to be attached.

*Effect of Embodiment 1*

As described above, the fraudulent email decision device 10 according to Embodiment 1 decides whether or not a subject email is a fraudulent email, from a relationship between an intention of the subject email and another incoming email received from the same sender as the sender of the subject email. This makes it possible to properly detect a targeted-attack email.

In particular, also in a case where the writing habits of a person to impersonate are exactly imitated and in a case where a past email is appropriated unchanged, a fraudulent email can be detected according to a condition such as non-matching of a topic of the incoming email and a contradiction in the transaction. Therefore, it is possible to prevent malware contamination by a sophisticated attack attempted via an email.

In particular, the fraudulent email decision device 10 according to Embodiment 1 decides whether a subject email is a fraudulent email, based on a function term indicating an intention of the subject email and a condition according to a mail type. As a result, a targeted attack email can be detected more properly.

*Other Configurations*

<Modification 1>

In Embodiment 1, the individual constituent elements are implemented by software. However, according to Modification 1, the individual constituent elements may be implemented by hardware. Modification 1 will be described regarding its difference from Embodiment 1.

Figure 17:
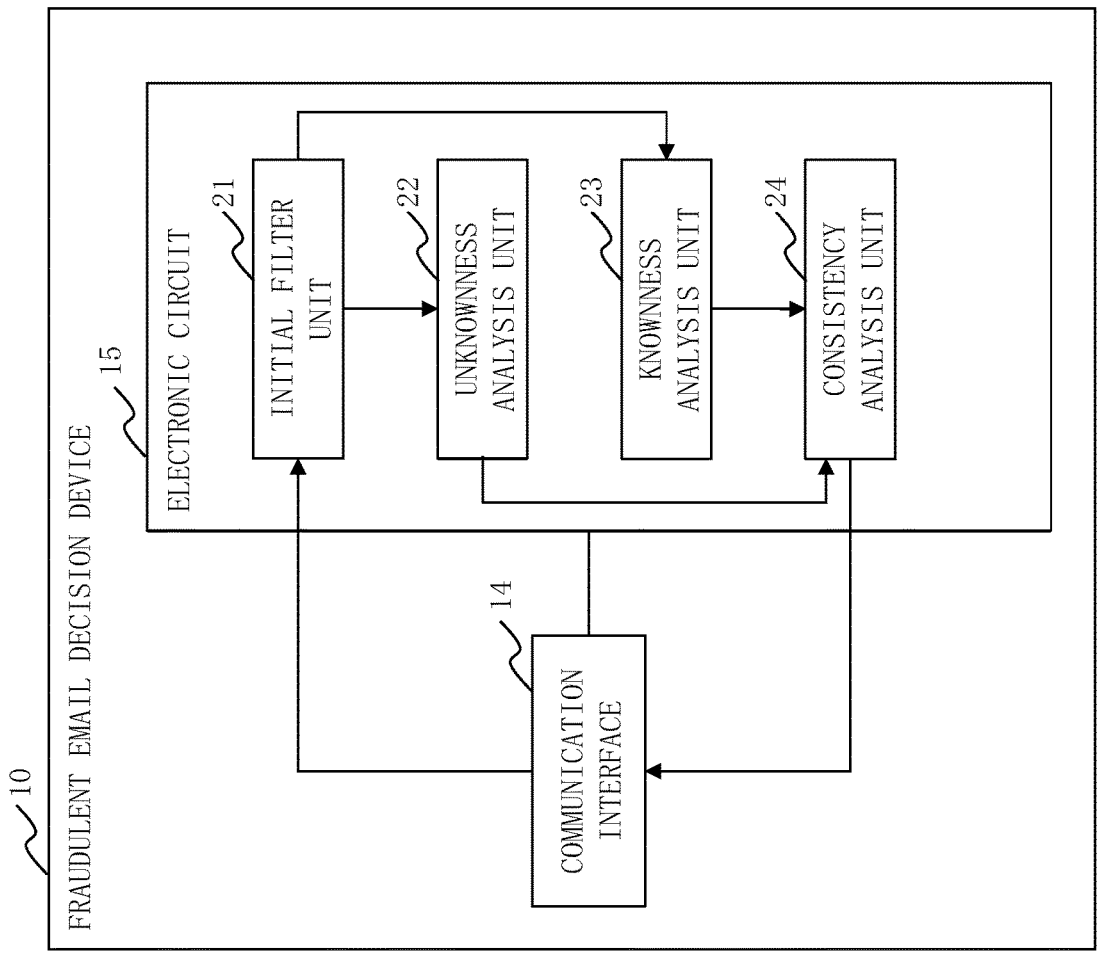
FIG. 17 is a configuration diagram of a fraudulent email decision device 10 according to Modification 1.

A configuration of a fraudulent email decision device 10 according to Modification 1 will be described with referring to FIG. 17.

In a case where individual function constituent elements are implemented by hardware, the fraudulent email decision device 10 is provided with an electronic circuit 15, in place of a processor 11, a memory 12, and a storage 13. The electronic circuit 15 is a dedicated circuit that implements functions of the individual constituent elements and functions of the memory 12 and storage 13.

The electronic circuit 15 is assumed to be a single circuit, a composite circuit, a programmed processor, a parallel-programmed processor, a logic IC, a Gate Array (GA), an Application Specific Integrated Circuit (ASIC), or a Field-Programmable Gate Array (FPGA).

The function constituent elements may be implemented by one electronic circuit 15. Alternatively, the function constituent elements may be implemented by a plurality of electronic circuits 15 through distribution.

<Modification 2>

According to Modification 2, some of the function constituent elements may be implemented by hardware, and the remaining function constituent elements may be implemented by software.

The processor 11, the memory 12, the storage 13, and the electronic circuit 15 are referred to as processing circuitry. That is, functions of the individual function constituent elements are implemented by processing circuitry.

Embodiment 2

An intention of a subject email is identified from the entire body of the subject email. This is where Embodiment 2 is different from Embodiment 1. In Embodiment 2, this difference will be described, and description on the same matters will be omitted.

*Description of Configuration*

Figure 18:
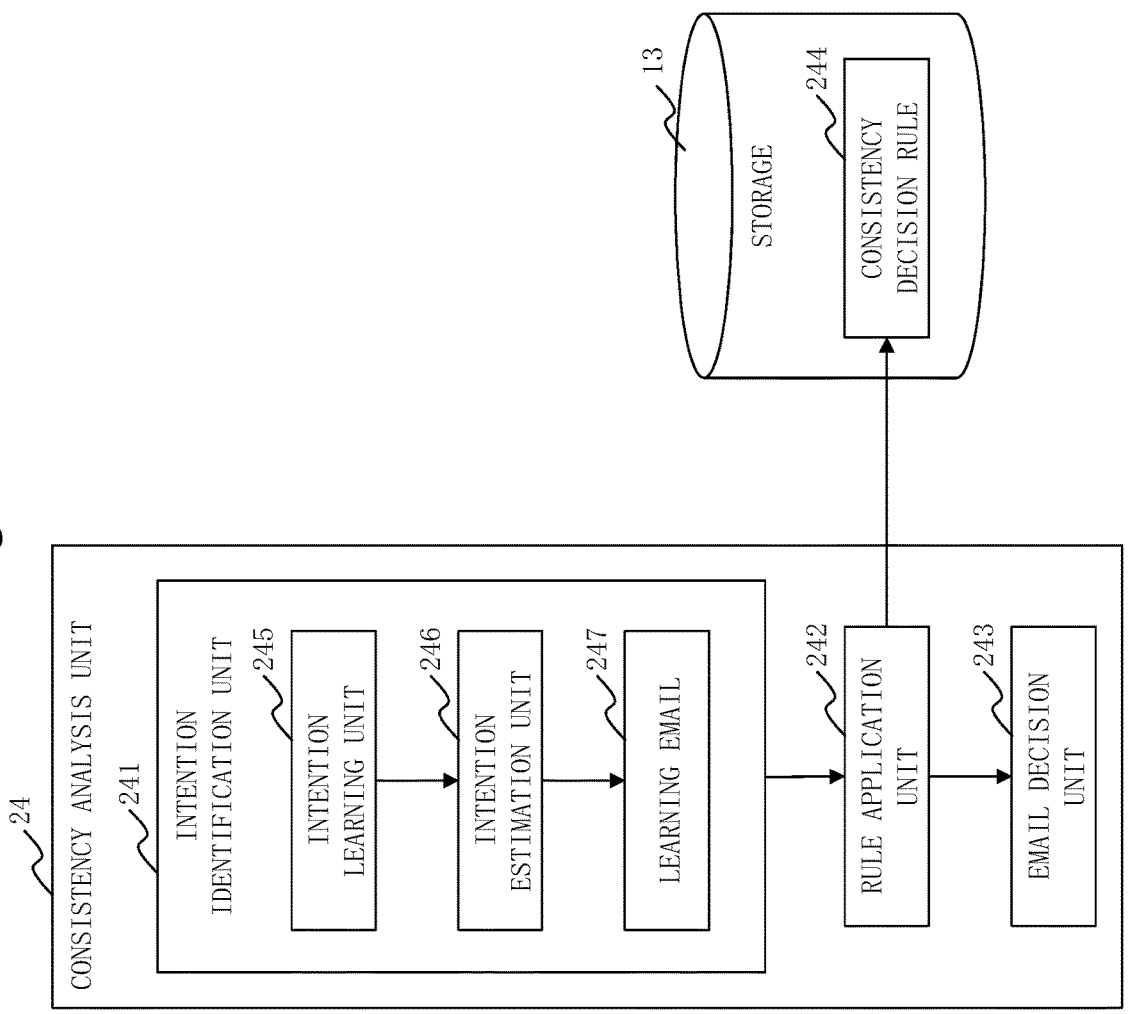
FIG. 18 is a configuration diagram of a consistency analysis unit 24 according to Embodiment 2.

A configuration of a consistency analysis unit 24 according to Embodiment 2 will be described with referring to FIG. 18.

Figure 5:
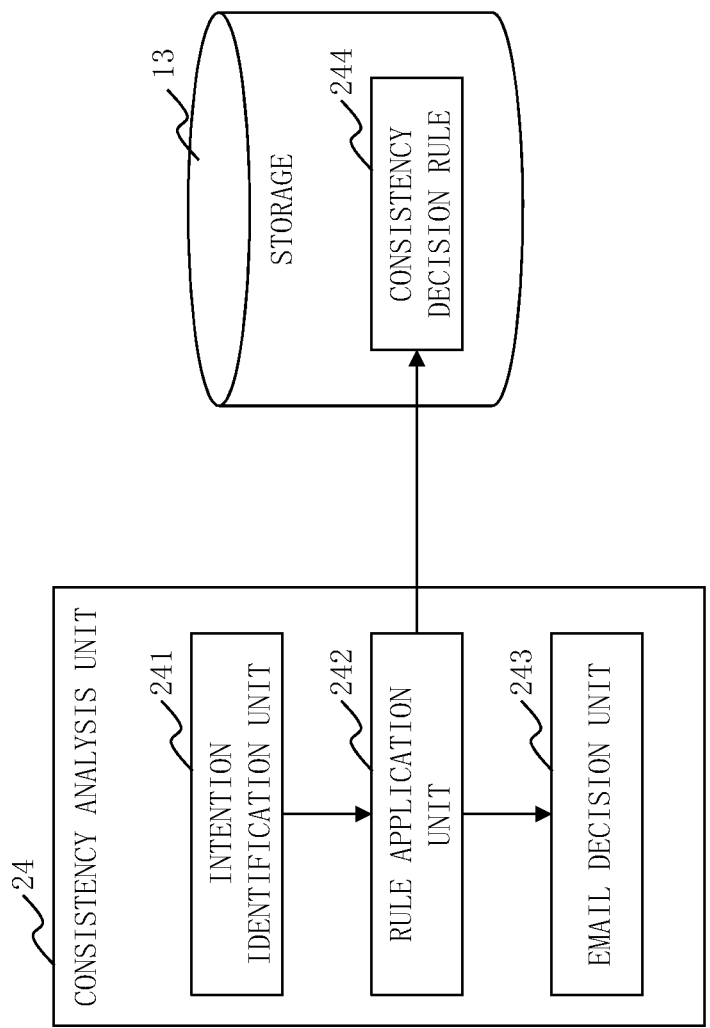
FIG. 5 is a configuration diagram of a consistency analysis unit 24 according to Embodiment 1.

The consistency analysis unit 24 is different from the configuration illustrated in FIG. 5 in that an intention identification unit 241 is provided with an intention learning unit 245, an intention estimation unit 246, and a learning email 247.

*Description of Operations*

Figure 19:
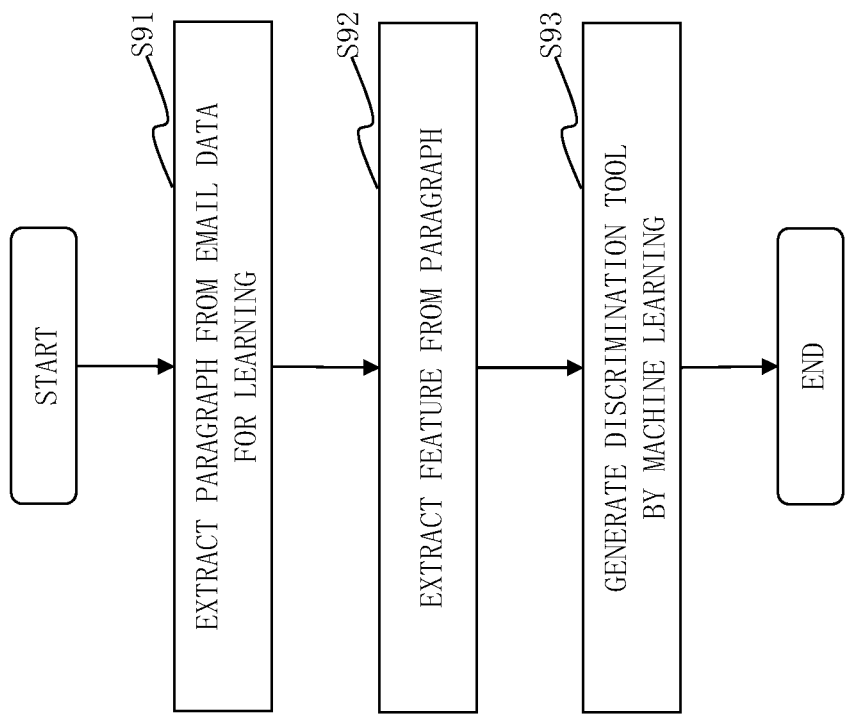
FIG. 19 is a flowchart of a processing of an intention learning unit 245 according to Embodiment 2.

Operations of the fraudulent email decision device 10 according to Embodiment 2 will be described with referring to FIGS. 19 and 20.

The operations of the fraudulent email decision device 10 according to Embodiment 2 correspond to a fraudulent email decision method according to Embodiment 2. The operations of the fraudulent email decision device 10 according to Embodiment 2 also correspond to a fraudulent email decision program according to Embodiment 2.

A processing of the intention learning unit 245 according to Embodiment 2 will be described with referring to FIG. 19.

(Step S91: First Paragraph-Extraction Process)

The intention learning unit 245 extracts all paragraphs from email data included in the learning email 247. Data of bodies of a plurality of emails in which labels indicating function terms are attached to each paragraph are registered in the learning email 247.

(Step S92: Fourth Feature-Extraction Process)

The intention learning unit 245 extracts features from each paragraph extracted in step S91, by the same method as that of step S42 of FIG. 10.

(Step S93: Learning Process)

The intention learning unit 245 performs supervised learning based on the features extracted from each paragraph in step S92 and the labels attached to each paragraph, in the same manner as in step S45 of FIG. 10. Here, a discrimination tool that discriminates which label a feature corresponds to is generated. In other words, a discrimination tool that discriminates which function term a feature corresponds to is generated.

A processing of the intention estimation unit 246 according to Embodiment 2 will be described with referring to FIG. 20.

(Step S101: Fifth Body-Extraction Process)

The intention estimation unit 246 extracts the body from the subject email.

(Step S102: Second Paragraph-Extraction Process)

The intention estimation unit 246 extracts paragraphs from the body extracted in step S101.

(Step S103: Fifth Feature-Extraction Process)

The intention estimation unit 246 extracts features from each paragraph extracted in step S102, by the same method as that of step S42 of FIG. 10.

(Step S104: Third Discrimination Process)

The intention estimation unit 246, with respect to each paragraph as a subject, calculates a discrimination score, by which a subject paragraph corresponds to each function term, based on the discrimination tool generated in step S93 and the features extracted from the subject paragraph in step S103.

(Step S105: Discrimination Score Decision Process)

The intention estimation unit 246 decides whether or not a function term whose discrimination score calculated in step S104 is equal to a third threshold or more is included.

If a function term whose discrimination score is equal to the third threshold or more is included, a list of function terms whose discrimination scores are equal to the third threshold or more is generated. On the other hand, if a function term whose discrimination score is equal to the third threshold or more is not included, the subject email is decided as not being a fraudulent email, and the processing is ended.

It is not just that a list of function terms which each paragraph is discriminated as corresponding to is generated, but a list of function terms whose discrimination scores are equal to the third threshold or more is generated. As a result, a list of only function terms which the paragraph may correspond to by a possibility of a certain level or more is generated.

*Effect of Embodiment 2*

In Embodiment 1, the intention identification unit 241 identifies an intention of a subject email by extracting a word that is similar to a function term registered in advance. In this case, if a word similar to the function term is unintentionally used in the body, an intention will be detected erroneously.

In contrast to this, the fraudulent email decision device 10 according to Embodiment 2 identifies an intention from the whole body of the email. Therefore, even if a word similar to the function term is unintentionally used in the body, the intention can be identified properly.

REFERENCE SIGNS LIST

10: fraudulent email decision device; 11: processor; 12: memory; 13: storage; 14: communication interface; 15: electronic circuit; 21: initial filter unit; 211: sender extraction unit; 212: blacklist decision unit; 213: content decision unit; 214: difference decision unit; 215: knownness decision unit; 216: blacklist; 22: unknownness analysis unit; 221: destination decision unit; 222: identity decision unit; 223: contact card decision unit; 224: open information decision unit; 225: person-name dictionary data; 226: fixed-form sentence data; 227: recipient profile; 23: knownness analysis unit; 231: personal identification decision unit; 232: topic decision unit; 233: profile generation unit; 234: matching decision unit; 235: sender profile; 24: consistency analysis unit; 241: intention identification unit; 242: rule application unit; 243: email decision unit; 244: consistency decision rule; 245: intention learning unit; 246: intention estimation unit; 247: learning email; 30: contact card management system.

The invention claimed is:

1. A fraudulent email decision device comprising:
processing circuitry configured to, with respect to a newly received incoming email as a subject email,
identify an intention of the subject email from a body of the subject email by extracting one or more words from the body of the subject email, calculating for each extracted word a similarity between the extracted word and one or more function terms registered in advance, a function word expressing a reason a subject email was sent, and identifying the intention expressed by the function term similar to the extracted word, as the intention of the subject email; and
decide whether or not the subject email is a fraudulent email, from a relationship among the subject email, another incoming email received from a same sender as a sender of the subject email, and the identified intention of the subject email.

2. The fraudulent email decision device according to claim 1, wherein the processing circuitry calculates an evaluation value, by which the body of the subject email corresponds to each function term, based on a discrimination tool obtained from a past incoming email by machine learning, extracts a function term whose calculated evaluation value is equal to a threshold or more, and identifies an intention expressed by the extracted function term, as the intention of the subject email.

3. The fraudulent email decision device according to claim 1, wherein the processing circuitry decides whether or not the subject email is a fraudulent email, from a condition that matches with the identified intention, the subject email, and said another incoming email.

4. The fraudulent email decision device according to claim 3, wherein the processing circuitry
decides whether or not a topic of the subject email is included in said another incoming email, and
decides whether or not the subject email is a fraudulent email, from a condition that matches with an email type indicating that the subject email is a topic matching email or a topic non-matching email, and that matches with the identified intention, the topic matching email being a subject email whose topic is decided as being included in said another incoming email, the topic non-matching email being a subject email whose topic is decided as not being included in said another incoming email.

5. The fraudulent email decision device according to claim 4, wherein the email type indicates whether or not there is another incoming email received from the same sender as the sender of the subject email, and in a case where there is another incoming email received from the same sender as the sender of the subject email, indicates that the subject email is the topic matching email or the topic non-matching email.

6. The fraudulent email decision device according to claim 5, wherein, in a case where there is no other incoming email received from the same sender as the sender of the subject email, the email type indicates that the subject email is a contact-card-existing email or a related-field email, the contact-card-existing email being a subject email whose sender has been registered in a contact card management system which manages a contact card, the related-field email being a subject email whose information identified from an email address of the sender of the subject email is related to a recipient of the subject email.

7. The fraudulent email decision device according to claim 1, wherein the processing circuitry decides that the subject email is a fraudulent email in a case where a destination of the body of the subject email does not include a name of a recipient of the subject email.

8. The fraudulent email decision device according to claim 1, wherein the processing circuitry decides that the subject email is a fraudulent email in a case where a sender of the subject email does not state his or her name in the body of the subject email.

9. A fraudulent email decision method comprising:
with respect to a newly received incoming email as a subject email, identifying an intention of the subject email from a body of the subject email by extracting one or more words from the body of the subject email, calculating for each extracted word a similarity between the extracted word and one or more function terms registered in advance, a function word expressing a reason a subject email was sent, and identifying the intention expressed by the function term similar to the extracted word, as the intention of the subject email; and
deciding whether or not the subject email is a fraudulent email, from a relationship among the subject email, another incoming email received from a same sender as the sender of the subject email, and an identified intention of the subject email.

10. A non-transitory computer readable medium recorded with a fraudulent email decision program which causes a computer to execute:
an intention identification process of, with respect to a newly received incoming email as a subject email, identifying an intention of the subject email from a body of the subject email by extracting one or more words from the body of the subject email, calculating for each extracted word a similarity between the extracted word and one or more function terms registered in advance, a function word expressing a reason a subject email was sent, and identifying the intention expressed by the function term similar to the extracted word, as the intention of the subject email; and
an email decision process of deciding whether or not the subject email is a fraudulent email, from a relationship among the subject email, another incoming email received from a same sender as the sender of the subject email, and an intention, identified by the intention identification process, of the subject email.

\* \* \* \* \*